United States Patent
Ayaz et al.

(10) Patent No.: US 12,238,722 B2
(45) Date of Patent: Feb. 25, 2025

(54) COMMUNICATION DEVICES AND METHODS FOR PROVIDING MULTIHOP TRANSMISSION

(71) Applicant: HUAWEI TECHNOLOGIES CO., LTD., Guangdong (CN)

(72) Inventors: Serkan Ayaz, Munich (DE); Ömer Bulakci, Munich (DE); Richard Stirling-Gallacher, Munich (DE); Jian Luo, Munich (DE); Zhongfeng Li, Shanghai (CN); Chan Zhou, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/398,446

(22) Filed: Aug. 10, 2021

(65) Prior Publication Data
US 2021/0377993 A1 Dec. 2, 2021

Related U.S. Application Data

(63) Continuation of application No. PCT/EP2019/053867, filed on Feb. 15, 2019.

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0035* (2013.01); *H04L 5/0037* (2013.01);
(Continued)

(58) Field of Classification Search
None
See application file for complete search history.

(56) References Cited

U.S. PATENT DOCUMENTS

2014/0177449 A1* 6/2014 Novak ............... H04W 4/80
370/329
2016/0262001 A1* 9/2016 Gupta ............... H04W 72/04
(Continued)

FOREIGN PATENT DOCUMENTS

| CN | 106612561 A | 5/2017 | |
|---|---|---|---|
| WO | WO-2017067503 A1 * | 4/2017 | ............ H04W 72/12 |
| WO | WO-2017179133 A1 * | 10/2017 | ............ H04W 16/26 |

OTHER PUBLICATIONS

3GPP TS 36.212 V15.4.0 (Dec. 2018), "3rd Generation Partnership Project; Technical Specification Group Radio Access Network; Evolved Universal Terrestrial Radio Access (E-UTRA); Multiplexing and channel coding(Release 15)," Dec. 2018, 247 pages.
(Continued)

*Primary Examiner* — Jay L Vogel
(74) *Attorney, Agent, or Firm* — Fish & Richardson P.C.

(57) ABSTRACT

Example methods and apparatus for multihop transmission are described. One example method includes receiving a scheduling request by a network device from a User Equipment (UE) for a multihop transmission. The network device sends a first message to one or more UEs in response to the scheduling request, wherein the first message indicates one or more sidelink resources and/or sidelink resource allocation information for the one or more UEs to perform a multihop transmission.

20 Claims, 18 Drawing Sheets

(51) Int. Cl.
*H04W 76/14* (2018.01)
*H04W 88/04* (2009.01)
*H04W 92/18* (2009.01)

(52) U.S. Cl.
CPC ........... *H04L 5/0094* (2013.01); *H04W 76/14* (2018.02); *H04L 5/0007* (2013.01); *H04W 88/04* (2013.01); *H04W 92/18* (2013.01)

(56) References Cited

U.S. PATENT DOCUMENTS

| | | | | |
|---|---|---|---|---|
| 2018/0115873 A1* | 4/2018 | Aminaka | ............... | H04W 8/005 |
| 2019/0132784 A1* | 5/2019 | Thubert | .............. | H04W 72/044 |
| 2019/0173612 A1* | 6/2019 | Kimura | ................ | H04L 1/0063 |
| 2019/0268904 A1* | 8/2019 | Miao | ..................... | H04W 52/02 |
| 2020/0178216 A1* | 6/2020 | Huang | ................ | H04L 1/0003 |

OTHER PUBLICATIONS

3GPP TS 36.321 V15.4.0 (Dec. 2018), "3rd Generation Partnership Project; Technical Specification Group Radio Access Network; Evolved Universal Terrestrial Radio Access (E-UTRA); Medium Access Control (MAC) protocol specification (Release 15)," Dec. 2018, 131 pages.

3GPP TS 36.331 V15.3.0 (Sep. 2018), "3rd Generation Partnership Project; Technical Specification Group Radio Access Network; Evolved Universal Terrestrial Radio Access (E-UTRA); Radio Resource Control (RRC); Protocol specification (Release 15)," Sep. 2018, 918 pages.

3GPP TR 37.885 V15.2.0 (Dec. 2018), "3rd Generation Partnership Project; Technical Specification Group Radio Access Network; Study on evaluation methodology of new Vehicle-to-Everything (V2X) use cases for LTE and NR;(Release 15)," Dec. 20, 38 pages.

3GPP TS 38.211 V15.4.0 (Dec. 2018), "3rd Generation Partnership Project; Technical Specification Group Radio Access Network; NR; Physical channels and modulation(Release 15)," Dec. 2018, 96 pages.

3GPP TS 38.212 V15.4.0 (Dec. 2018), 3rd Generation Partnership Project; Technical Specification Group Radio Access Network; NR; Multiplexing and channel coding(Release 15), 100 pages.

3GPP TS 38.213 V15.4.0 (Dec. 2018), "3rd Generation Partnership Project; Technical Specification Group Radio Access Network; NR; Physical layer procedures for control(Release 15)," Dec. 2018, 104 pages.

3GPP TS 38.321 V15.4.0 (Dec. 2018), "3rd Generation Partnership Project; Technical Specification Group Radio Access Network; NR; Medium Access Control (MAC) protocol specification(Release 15)," Dec. 2018, 77 pages.

3GPP TS 38.331 V15.4.0 (Dec. 2018), "3rd Generation Partnership Project; Technical Specification Group Radio Access Network; NR; Radio Resource Control (RRC) protocol specification(Release 15)," Dec. 2018, 474 pages.

3GPP TR 38.885 V1.0.0 (Nov. 2018), "3rd Generation Partnership Project; Technical Specification Group Radio Access Network; NR; Study on Vehicle-to-Everything (Release 16)," Nov. 2018, 23 pages.

General Dynamics, "Resource Pool Configuration for D2D Communication," 3GPP TSG-RAN2#85bis, R2-141609, Valencia, Spain, Mar. 31-Apr. 4, 2014, 7 pages.

PCT International Search Report and Written Opinion issued in International Application No. PCT/EP2019/053867 on Oct. 22, 2019, 12 pages.

Vodafone, "New SID: Study on NR V2X," 3GPP TSG RAN Meeting #80, RP-181429, La Jolla, USA, Jun. 11-14, 2018, 5 pages.

Office Action issued in Chinese Application No. 201980092144.5 on Jun. 6, 2022, 18 pages (with English translation).

* cited by examiner

COMMUNICATION DEVICES AND METHODS FOR PROVIDING MULTIHOP TRANSMISSION

CROSS-REFERENCE TO RELATED APPLICATION

This application is a continuation of International Application No. PCT/EP2019/053867, filed on Feb. 15, 2019, the disclosure of which is hereby incorporated by reference in its entirety.

TECHNICAL FIELD

The present disclosure relates generally to the field of mobile communication. In particular, the invention relates to a network device (BS), a wireless communication device (UE), a method for the network device, and a method for the wireless communication device for providing a multihop transmission. To this end, the disclosure proposes a new type of control information (e.g., in the form of downlink control information (DCI) configuration (i.e., the multihop DCI) and/or multihop Radio Resource Control (RRC) configuration) for multihop communication to reduce signaling overhead for the multihop communication.

BACKGROUND

Generally, according to the New Radio (NR) vehicle-to-everything (V2X) Study Item (SI) with the reference number "RP-181429", in the 3GPP Radio Access Network (RAN) plenary, the sidelink frequencies for frequency range (FR1 (i.e., sub 6 GHz) and FR2 (i.e., millimetre wave (mm-Wave) up to 52.6 GHz)) are considered for the NR V2X sidelink communication. Accordingly, the NR V2X SI in the RAN1 is considering mm-Wave transmission (i.e., FR2) for sidelink transmission, which may require multihop transmission due to signal propagation characteristics on high frequency bands. Furthermore, the enhanced V2X (eV2X) traffic models include not only periodic traffic patterns but also the aperiodic traffic patterns according to the 3GPP TR 37.885.

Moreover, in the gNB (base station in 5G) based sidelink scheduling scenarios (i.e., Mode-1 according to the 3GPP TR 38.885), both dynamic scheduling and semi-persistent scheduling (SPS) (e.g., configured grant type 2 in the NR as defined in 3GPP TS 38.331) will be two main scheduling functions for the NR V2X. In addition, when both traffic models (periodic and aperiodic) are considered, the control signaling of the dynamic and the SPS scheduling may create considerable overhead, for example, in the case that multihop communication is used. In such a scenario, reduction of signaling overhead due to dynamic and SPS scheduling over downlink control channel (i.e., the Physical Downlink Control Channel, PDCCH) becomes an important matter.

Furthermore, if the current state-of-the-art (SotA) signaling is used for the sidelink for the dynamic and the SPS scheduling (i.e., the DCI 5A), in the case of multihop communication, there is a significant control signaling overhead increase over the control channel (e.g., Physical downlink control channel (PDCCH) and/or RRC) for the multihop transmissions.

In the following, the available conventional solutions and their disadvantages are briefly discussed.
1. V2X Sidelink Communication in Release 14 (Rel. 14)

The conventional V2X sidelink (SL) communication in the Rel. 14 does not support the multihop communication, and additionally, it does not support the unicast and the multicast transmissions. Moreover, in order to adapt the current standard to support the multihop transmission, re-use of the current standard signaling for each transmitter in the group is needed; namely, the Sidelink Scheduling Request (SR) (i.e., the Sidelink Buffer Status Report (BSR)/the Sidelink Semi-Persistent Scheduling (SPS) Request), and the Sidelink Scheduling Grant (SG) (i.e., the DCI Format 5A).

The sidelink BSR has the following fields, as specified in the 3GPP TS 36.321:
  Destination Index, Logical Channel Group ID (LCG ID), Buffer Size.
The sidelink SPS Request (i.e., TrafficPatternInfo in sps-AssistanceInformation as specified in 3GPP TS 36.331):
  trafficPeriodicity, timingOffset, priorityInfoSL, logicalChannelIdentity, messageSize.
The Sidelink Scheduling Grant (SG) is carried within the DCI Format 5A (according to TS 36.212) and it has the following fields:
  Carrier indicator (3 Bit).
  Lowest index of the subchannel allocation of the initial transmission ($\lceil \log_2(N_{subchannel}^{SL}) \rceil$ Bit).
  Frequency resource location of initial transmission and retransmission, indicated by a resource indication value (RIV) ($\lceil \log_2(N_{subchannel}^{SL}(N_{subchannel}^{SL}+1)/2) \rceil$ Bit).
  Time gap between initial transmission and retransmission (4 Bit).
  SL index (in case TDD operation) (2 Bit).
  SL SPS configuration index (SPS case) (3 Bit).
  Activation/release indication (SPS case) (1 Bit).
Furthermore, from transmission timing aspect, in the prior art, the user equipment (UE) will perform sidelink transmission at a time which starts at least 4 subframes (i.e., 4 ms) after the subframe in which the sidelink grant was received.

FIG. 16 schematically illustrates a base station scheduled (mode 1) multihop transmission over the sidelink, according to prior art. For example, as it is shown in FIG. 16, applying the SotA signaling to multi-hop communication, if there are four UEs (i.e., UE1 1610, UE2 1620, UE3 1630, UE4 1640) in the group and the UE1 1610 wants to transmit a message to the UE4 1640, the following steps will be performed:
1. The UE1 1610 performs its local signaling (SR, SG) with the BS 1600 over the Uu interface and performs sidelink transmission to the UE2 1620.
2. The UE2 1620 receives the sidelink message from the UE1 1610 and performs its local signaling (SR, SG) with the BS 1600 over the Uu interface and performs sidelink transmission to the UE3 1630.
3. The UE3 1630 receives the sidelink message from the UE2 1620 and performs its local signaling (SR, SG) with the BS 1600 over the Uu interface and performs sidelink transmission to the UE4 1640.
4. The UE4 1640 receives the sidelink message from the UE3 1630.

Based on this approach, each UE performs its local signaling (SR, SG) with the BS which may increase the signaling overhead over the Uu interface (i.e., the interface between a UE and the BS).
2. Usage of RNTI Conventionally, the Radio Network Temporary Identifiers (RNTIs) are used for scrambling the CRC values of the control or data channel information, as it is shown in FIG. 17.

FIG. 17 schematically illustrates a conventional Radio Network Temporary Identifiers (RNTIs) operation 1700, according to prior art. There are different RNTI values used for different purposes as it is specified in the 3GPP TS 36.321 for the LTE and the 3GPP TS 38.321 for New Radio (NR), as it is shown in the RNTI operation 1700 in FIG. 17.

For example, the Cell-RNTI (C-RNTI) identifies a UE having a radio resource control (RRC) connection within a cell in LTE. RNTIs are used for scrambling the cyclic redundancy check (CRC) values of the control channel information as well as the scrambling of the complete data channel information. In DCI transmission case, user checks whether the received information passes CRC check. If it passes the check, DCI information is delivered to higher layer for processing the DCI information.

3. 5G New Radio (NR) Capabilities

The 3GPP New Radio (NR) standard has various new features compared to the 3GPP LTE standard. In the following, some of these new features are briefly discussed.

Flexible Numerology: 3GPP NR supports the numerologies shown in Table I with different sub-carrier spacing ($\Delta f$) according to the 3GPP TS 38.211.

TABLE I

Different Numerologies (3GPP TS 38.211)

| $\mu$ | $\Delta f = 2^\mu \cdot 15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

Slot Duration: accordingly, the slot length changes depending on the numerology, as it is shown in Table II.

TABLE II

Number of the OFDM symbols per slot, slots per frame, slots per subframe and slot duration for normal CP.

| $\mu$ | $N_{symb}^{slot}$ | $N_{slot}^{frame,\mu}$ | $N_{slot}^{subframe,\mu}$ | $N_{slot}^{Duration}$ (ms) |
|---|---|---|---|---|
| 0 | 14 | 10 | 1 | 1 |
| 1 | 14 | 20 | 2 | 0.5 |
| 2 | 14 | 40 | 4 | 0.25 |
| 3 | 14 | 80 | 8 | 0.125 |
| 4 | 14 | 160 | 16 | 0.0625 |

Slot Format: different slot formats are defined in the 3GPP TS 38.213 in which downlink "D", uplink "U" and flexible "X" assignments may change at the symbol level.

Flexible time domain relation between the PDCCH and the physical downlink shared channel/physical uplink shared channel (PDSCH/PUSCH) transmission (Time domain resource assignment field in the DCI): different time domain relations may be setup by using the RRC signaling (i.e., $K_0$ field PDSCH-TimeDomainResourceAllocation, $K_2$ field PUSCH-TimeDomainResourceAllocation) as defined in 3GPP TS 38.331 and a certain index value (i.e., Time domain resource assignment) is indicated to the UE by BS within DCI (i.e., value 0 in the DCI field refers to the first element in PDSCH-TimeDomainResourceAllocationList or in PUSCH-TimeDomainResourceAllocationList) as defined in 3GPP TS 38.212.

Start and Length Indicator Value (SLIV): the SLIV denotes the starting symbol and the length of the allocation (in terms of the symbols). The starting symbol S is relative to the start of the slot and the number of the consecutive symbols L counting from the symbol S allocated for the PDSCH or the PUSCH. Different SLIV values may be configured by using the RRC signaling (i.e., startSymbolAndLength in PDSCH-TimeDomainResourceAllocation, PUSCH-TimeDomainResourceAllocation).

FIG. 18 schematically illustrates an exemplarily Time Domain Resource Assignment for the PDSCH transmission ($K_0$), according to prior art.

In this example, the DCI is sent by the BS 1800 in slot n and the respective PDSCH data is sent in slot $$\left\lfloor n \cdot \frac{2^\mu PDSCH}{2^\mu PDCCH} \right\rfloor + K_0$$

where $K_0$ is based on the numerology of the PDSCH and the $\mu_{PDCCH}$ and the $\mu_{PDCCH}$ are the subcarrier spacing configurations for the PDSCH and the PDCCH, respectively. In that slot, the exact location of the PDSCH data is determined based on the SLIV.

Bandwidth Part (BWP): if a UE supports active BWP change, the DCI may also include the BWP indication information for the resource allocation. For each serving cell the network configures at least an initial BWP comprising at least a downlink BWP and one (e.g., if the serving cell is configured with an uplink) or two (e.g., if using supplementary uplink (SUL)) uplink BWPs for a certain carrier. Furthermore, the network may configure additional uplink and downlink BWPs for a serving cell. BWP configuration is further split into uplink and downlink parameters and into common and dedicated parameters. Common parameters (in BWP-UplinkCommon and BWP-DownlinkCommon) are "cell specific" and the network ensures the necessary alignment with corresponding parameters of other UEs as explained in 3GPP TS 38.331.

Note that, according to the agreements in the TR 38.885, only one SL BWP is configured in a carrier in the NR V2X Sidelink. Furthermore, different number of resource pools can be configured within a SL BWP and each resource pool supports only one numerology.

Resource Allocation Types: the 3GPP NR supports two types of resource block allocations; type 0 is the bitmap based allocation and type 1 is the start and length based allocation. In type 0 case, depending on the bandwidth size, different number of physical resource blocks (PRBs) can be assigned within a resource block group (RBG). Each element of a bitmap carried inside DCI indicates which RBGs are set (i.e., set to 1 in bitmap) or unset (i.e., set to 0 in bitmap) that are assigned to be used in order to carry the PDSCH or the PUSCH data for a specific UE. Since any bit is settable in bitmap, allocated RBGs may not be consecutive. In type 1 case, resource allocation is performed per resource block (RB) and a resource indicator value (RIV) is used to determine which RBs are assigned to the UE. In this approach, RBs are assigned consecutively to UEs (i.e., with a certain starting RB and number of consecutive RBs within BWP). This information is signaled with Frequency domain resource assignment field in DCI. In the V2X sidelink communication in Rel. 14, mode-3 operation uses a similar method like in type 1.

4. DCI Blind Decoding Complexity

Different DCI formats which are preconfigured in the UE, can be used for transmission in the 3GPP LTE and the New Radio (NR) technologies in the Physical Downlink Control Channel (PDCCH). During the DCI decoding operation, the UE however does not know explicitly which DCI is transmitted by the Base Station and the UE performs blind search among all possible DCI formats. Moreover, in case new DCI formats with different sizes are defined, then this increases the search space in the UE (i.e., increase of DCI blind decoding complexity at the UE). Since a new DCI format may be proposed, in some embodiment of this invention different options may be considered which will be discussed in the following.

SUMMARY

In view of the above-mentioned problems and disadvantages, the present disclosure describes improvements to the conventional devices and methods. An objective is to provide a network device, a wireless communication device, a method for the network device, and a method for the wireless communication device for providing (e.g., performing) a multihop transmission. In particular, in some embodiments, an efficient multihop DCI for the NR V2X Sidelink Communication is desired.

The objective is achieved by the solution provided in the enclosed independent claims. Advantageous implementations of the present invention are defined in the dependent claims.

In particular it is proposed a new type of DCI configuration option (i.e., the multihop DCI) to reduce the signaling overhead for the multihop transmission. The proposed design also covers the new aspects of the 3GPP New Radio (NR), which is initially supporting only uplink and downlink communication. However, such new functions may also be used by the NR V2X sidelink communication.

For example, some embodiments of the invention may be adapted to the multihop topology changes (e.g., removal and/or addition of a vehicle from/to a multihop group, and change of the spatial constellation of the vehicles, etc.) and/or wireless channel changes among vehicles in the multihop group.

A first aspect provides network device (BS) configured to receive a scheduling request from a User Equipment (UE) in particular for a multihop transmission; and send a first message to one or more UEs in response to the scheduling request, wherein the first message indicates one or more sidelink resources and/or sidelink resource allocation information for the one or more UEs to perform a multihop transmission.

For example, in some embodiments, the BS may schedule the sidelink transmissions over the physical sidelink shared channel (PSSCH) (i.e., the mode-3 scheduling according to the V2X sidelink communication in Rel.14 or mode-1 scheduling according to the NR V2X (eV2X) sidelink communication for the advanced use cases in Rel.16) in which the UEs are using high frequency spectrum (i.e., FR2-millimetre wave up to 52.6 GHz) for the sidelink transmission. Moreover, in this spectrum, due to wireless channel characteristics of the high frequency, sidelink transmissions may also make use of the multi-hop transmissions among the UEs.

The BS may determine, if it is a multihop or a single hop transmission. Moreover, an efficient BS scheduled sidelink transmissions over multihop groups may be performed, e.g., a new type of the DCI may be proposed along with various configuration options.

In some embodiments, as an initial allocation for the sidelink transmission, the proposed multihop DCI type 1 (MH-DCI type 1) may include a baseline DCI (which may be used by the initially transmitting UE) and also the corresponding resource allocations (for the intermediate UEs) relative to the baseline DCI (e.g., in time and frequency). That is, the reference resource allocation is the one for the originating UE. The multihop DCI approach may thus reduce the signaling overhead, for example, due to the proposed structure of resource allocation.

In some embodiments, the multihop topology updates and/or wireless channel updates may be provided.

In some embodiments, various design options may be provided for the multihop resource allocation including additional parameters that may be a part of the new DCI format.

In some embodiments, the beam-based transmissions over the Uplink/Downlink (Uu interface) may be provided which may be used to transmit multihop scheduling request for the sidelink radio resource (i.e., multihop sidelink scheduling request), and may further be used to receive the multihop scheduling grant for the sidelink radio resource (i.e., multihop sidelink scheduling grant). Moreover, the beam-based transmissions over the sidelink (PC5 interface) may be used to transmit and/or receive the actual sidelink control and user data.

In addition, although the current proposals of this disclosure exemplarily consider Rel.14 V2X sidelink communication scheduling mechanism as baseline (i.e., DCI Format 5A), these proposals may also be considered when Rel.16 eV2X sidelink communication scheduling mechanism is developed under a new DCI format (e.g., DCI Format 5B). That is, the proposals covered herein can be applied to new DCI formats that may be introduced in future releases.

In some embodiments, a new type of resource grant in the NR which is defined for uplink transmissions and called Configure Grant Type 1, in addition to the DCI based allocation which is called Configured Grant Type 2, may be used, e.g., for transmission of multihop parameters to the UEs. Moreover, in the Configured Grant Type 1 approach, the resource grant is activated without any DCI transmission, which may be managed by providing an extended set of RRC parameters (called rrc-ConfiguredUplinkGrant in 3GPP TS 38.331) including timeDomainoffset parameter (e.g., which may be offset to System Frame Number (SFN)=0). In some embodiments, this approach may also be used by defining a new parameter called "rrc-ConfiguredMultihopSidelinkGrant" as a RRC message and it may include all the parameters that is exchanged with multihop DCI information.

In an implementation form of the first aspect, the sidelink resource allocation information comprises at least one of:
  one or more baseline sidelink resource for one or more UEs of the multihop transmission,
  relative sidelink resource allocation information for one or more UEs of the multihop transmission relative to the baseline sidelink resource,
  one or more additional information for one or more UEs of the multihop transmission.

In some embodiments, the additional information may comprise parameter information for the intermediate UEs without relation to a baseline information, such as the antenna setting, MCS, etc.

The originating UE may be the UE that initiate (e.g., originate) exchanging data over sidelink, for the multihop transmission. Moreover, the intermediate UEs may be the UEs that relay the sidelink data including the control information (i.e., sidelink control information (SCI)) to the final UE.

For example, the additional information may be or may include a time and/or a frequency -related information for the Acknowledgement (ACK) or Negative ACK (ACK/NACK)-transmissions, etc.

In a further implementation form of the first aspect, the first message indicates one or more sidelink resources and/or sidelink resource allocation information for the one or more UEs to perform an ACK/NACK sidelink transmission and/or a sidelink retransmission.

For example, the sidelink resources and/or the sidelink resource allocation information and/or the one or more additional information may comprise resources or information related to resources related to the ACK/NACK-communications (i.e., for the BS-Transmission or the Sidelink, etc.)

In some embodiments, considering reliable transmission over the sidelink for the NR V2X, performing retransmission by a transmitter based on the ACK/NACK reports sent by the receiver may be a requirement. Moreover, in this case, the sidelink resources and/or the sidelink resource allocation information and/or the one or more additional information may comprise not only for initial sidelink data transmission information but also include the following
1. the sidelink resources and/or sidelink resource allocation information and/or the one or more additional information for the ACK/NACK transmissions over the sidelink, and
2. the sidelink resources and/or the sidelink resource allocation information and/or the one or more additional information for the sidelink retransmissions.

Furthermore, since the ACK/NACK is transmitted by the receiver, the ACK/NACK sidelink resources and/or the sidelink resource allocation information and/or the one or more additional information may be used by the receivers. In addition, if the initial sidelink data transmission is correctly received by the receiver, the receiver may send an ACK message to the transmitter and if not correctly received by the receiver, the receiver may send a NACK message to the transmitter. In case a NACK message is transmitted by the receiver to the transmitter, the transmitter may retransmit the sidelink data which may require another sidelink resource and/or sidelink resource allocation information. This information (sidelink resource and/or sidelink resource allocation information) for the retransmission may be also carried by the multihop DCI (i.e., in the first message). For example, the transmitter may receive an ACK message from the receiver, moreover, the transmitter does not use the sidelink resource and/or sidelink resource allocation information for the retransmission and it may further inform the BS, so that the BS may assign this unused sidelink resource to another UE for the sidelink transmission.

In a further implementation form of the first aspect, the network device is further configured to send a second message to the one or more UEs comprising at least one change in the indicated one or more sidelink resources, sidelink resource allocation information, and/or additional information provided in the first message.

This is beneficial, since the follow up allocation updates for the periodic and/or aperiodic services may be sent, the overhead may be further reduced, and e.g., by only sending the changes in the sidelink resource allocation compared to the initial resource allocation, and as another form of multihop DCI (e.g., MH-DCI type 2) configuration options.

In a further implementation form of the first aspect, the at least one change is one or more of
a UE Transmitter List change,
a carrier indicator list change,
a time domain resource allocation change,
a frequency domain resource allocation change,
a time gap between an initial transmission and a retransmission change,
the Sidelink, SL, semi-persistent scheduling, SPS, configuration index, change,
an SPS activation and/or release indication change,
a Modulation and Coding Scheme, MCS, list information change,
the UE antenna type index list change,
the UE antenna panel index list change,
the UE antenna port index list change,
Resource Pattern Time Index, RPTI, list change,
Resource Pattern Frequency Index, RPFI, list change,
Resource Pattern Time Length, RPTL, List,
a transmit power list change,
a Frequency hopping—Multihop list change,
a Periodicity—Multihop list change,
a Demodulation Reference Signal (DMRS)—Multihop-SidelinkConfiguration list change,
a TransformPrecoder—Multihop list change,
a nrofHARQ-Processes—Multihop list change,
a repK-RV—Multihop list change,
a repK—Multihop list change,
a Powercontrol mode—Multihop list change,
a P0—MultiHop-PSSCH-AlphaSet list change.

In some embodiments, in the second message, any parameter may be updated.

In a further implementation form of the first aspect, the first message comprises one or more cyclic redundancy check, CRC, values encoded with Multihop Radio Network Temporary Identifiers, RNTI.

In a further implementation form of the first aspect, the network device is further configured to send, via a radio resource control, RRC, signaling, an RNTI to the one or more UEs.

In a further implementation form of the first aspect, the network device is further configured to create a Resource Pattern Frequency Index, RPFI, list comprising allocated sidelink resources blocks for each of a plurality of UEs involved in the multihop transmission, and include the RPFI list in the first message, and/or create a Resource Pattern Time Index, RPTI, list comprising time slot information of allocated sidelink resources blocks for each of the plurality of UEs involved in the multihop transmission, and include the RPTI list in the first message.

In a further implementation form of the first aspect, the network device is further configured to coordinate with another network device, in order to determine the one or more sidelink resources and/or resource allocation information, in particular when the plurality of UEs involved in the multihop transmission are served by the network device and the another network device.

In a further implementation form of the first aspect, the network device is further configured to include at least one antenna configuration, in particular an antenna type and/or an antenna port and/or an antenna panel, for the one or more UEs in the first message.

For example, each antenna type may have multiple antenna panels (i.e., the multi-panel antenna array) in which each panel may generate certain number of beam formed signals to certain direction. Moreover, different number of antenna panels may be defined (i.e., each panel has a unique index) such that they may be used for the transmission and/or reception for the sidelink communication. For example, the front bumper antenna of a vehicle may have two antenna panels, one covers from left front to middle front and the other covers from middle front to right front.

In a further implementation form of the first aspect, the first message is sent only to a cluster head of a group of UEs.

In a further implementation form of the first aspect, the first message comprises one or more of
a group identifier, ID,
a UE transmitter list,
a carrier indicator list,
a time domain resource allocation
a frequency domain resource allocation
the time gap between an initial transmission and a retransmission,
the Sidelink, SL, semi-persistent scheduling, SPS, configuration index,
an SPS activation and/or release indication,
Modulation and Coding Scheme, MCS, list information,
the UE antenna type index list,
the UE antenna panel index list,
the UE antenna port index list,
Resource Pattern Time Index, RPTI, list,
Resource Pattern Frequency Index, RPFI, list,
Resource Pattern Time Length, RPTL, List,
a transmit power list,
a Frequency hopping—Multihop list,
a Periodicity—Multihop list,
a Demodulation Reference Signal (DMRS)—Multihop-SidelinkConfiguration list,
a TransformPrecoder—Multihop list,
a nrofHARQ-Processes—Multihop list,
a repK-RV—Multihop list,
a repK—Multihop list,
a Powercontrol mode—Multihop list,
a P0—MultiHop-PSSCH-AlphaSet list.

For example, the Frequency hopping—Multihop list may be or may include the IntraSlot and InterSlot based frequency hopping which may be supported in multihop communication. Furthermore, the frequencyHoppingOffset parameter may enable the intra-slot frequency hopping with the given frequency hopping offset in the multihop communication.

The Periodicity—Multihop list may include (e.g., at least one) parameter which may denote the periodicity of sidelink multihop transmission. Depending on the selected numerology, the periodicity configuration types may change.

The Demodulation Reference Signal (DMRS)—MultihopSidelinkConfiguration list may include the DMRS—MultihopSidelinkConfiguration parameter which may be used in order to configure the DMRS configuration for the multihop communication. This parameter set may also include some additional parameters such as the dmrs-Type, maximum length and additional position information.

The TransformPrecoder—Multihop list, may include parameter which may enable or disable certain transform precoding operation (e.g., type 1 or type 2 in NR).

The nrofHARQ-Processes—Multihop list may include the number of HARQ processes configured at each transmitter over multihop communication.

The repK-RV—Multihop list may include the redundancy version (RV) sequence information to be used for each HARQ process.

The repK—Multihop list may include the number of repetitions used then retransmission is activated.

The Powercontrol mode—Multihop list may be or may include the open loop or the closed look transmit power control which may be applied in multihop communication. Moreover, each mode may have its own sub-types.

The P0—MultiHop-PSSCH-AlphaSet list may be or may include a set of P0 and alpha values used for power control when it is activated for multihop communication.

Moreover, the Resource Pattern Time Length (RPTL) List may be provided. The RPTL may be the length of the consecutive timeslot assignments (i.e., aggregation of timeslots) to the first and the follow up hops which may use the baseline RPTL allocation as reference timeslot allocation.

In a further implementation form of the first aspect, the multihop transmission is based on one or more of
a unicast type of multihop transmission,
a multicast type of multihop transmission,
a multiple multihop transmissions comprising subgroup multihop transmissions in the same group of UEs.

A second aspect provides a method for a network device, the method comprising receiving a scheduling request from a User Equipment, UE, in particular for a multihop transmission; and sending a first message to one or more UEs in response to the scheduling request, wherein the first message indicates one or more sidelink resources and/or sidelink resource allocation information for the one or more UEs to perform a multihop transmission.

In an implementation form of the second aspect, the sidelink resource allocation information comprises at least one of:
one or more baseline sidelink resource for one or more UEs of the multihop transmission,
relative sidelink resource allocation information for one or more UEs of the multihop transmission relative to the baseline sidelink resource,
one or more additional information for one or more UEs of the multihop transmission.

In a further implementation form of the second aspect, the first message indicates one or more sidelink resources and/or sidelink resource allocation information for the one or more UEs to perform an ACK/NACK sidelink transmission and/or a sidelink retransmission.

In a further implementation form of the second aspect, the method further comprises sending a second message to the one or more UEs comprising at least one change in the indicated one or more sidelink resources, sidelink resource allocation information, and/or additional information provided in the first message.

In a further implementation form of the second aspect, the at least one change is one or more of
a UE Transmitter List change,
a carrier indicator list change,
a time domain resource allocation change,
a frequency domain resource allocation change,
a time gap between an initial transmission and a retransmission change,
the Sidelink, SL, semi-persistent scheduling, SPS, configuration index, change,
an SPS activation and/or release indication change,
a Modulation and Coding Scheme, MCS, list information change,
the UE antenna type index list change,
the UE antenna panel index list change,
the UE antenna port index list change,
Resource Pattern Time Index, RPTI, list change, Resource Pattern Frequency Index, RPFI, list change,
Resource Pattern Time Length, RPTL, List,
a transmit power list change,
a Frequency hopping—Multihop list change,
a Periodicity—Multihop list change,
a Demodulation Reference Signal (DMRS)—Multihop-SidelinkConfiguration list change,
a TransformPrecoder—Multihop list change,
a nrofHARQ-Processes—Multihop list change,
a repK-RV—Multihop list change,
a repK—Multihop list change,
a Powercontrol mode—Multihop list change,
a P0—MultiHop-PSSCH-AlphaSet list change.

In a further implementation form of the second aspect, the first message comprises one or more cyclic redundancy check, CRC, values encoded with Multihop Radio Network Temporary Identifiers, RNTI.

In a further implementation form of the second aspect, the method further comprises sending, via a radio resource control, RRC, signaling, an RNTI to the one or more UEs.

In a further implementation form of the second aspect, the method further comprises creating a Resource Pattern Frequency Index, RPFI, list comprising allocated sidelink resources blocks for each of a plurality of UEs involved in the multihop transmission, and including the RPFI list in the first message, and/or creating a Resource Pattern Time Index, RPTI, list comprising time slot information of allocated sidelink resources blocks for each of the plurality of UEs involved in the multihop transmission, and including the RPTI list in the first message.

In a further implementation form of the second aspect, the method further comprises coordinating with another network device, in order to determine the one or more sidelink resources and/or resource allocation information, in particular when the plurality of UEs involved in the multihop transmission are served by the network device and the another network device.

For example, the inter-BS coordination may be provided in cases multihop communication needs to extend over more cells.

In a further implementation form of the second aspect, the method further comprises including at least one antenna configuration, in particular an antenna type and/or an antenna port and/or an antenna panel, for the one or more UEs in the first message.

In a further implementation form of the second aspect, the first message is sent only to a cluster head of a group of UEs.

In a further implementation form of the second aspect, the first message comprises one or more of
a group identifier, ID,
a UE transmitter list,
a carrier indicator list,
a time domain resource allocation,
a frequency domain resource allocation
the time gap between an initial transmission and a retransmission,
the Sidelink, SL, semi-persistent scheduling, SPS, configuration index,
an SPS activation and/or release indication,
Modulation and Coding Scheme, MCS, list information,
the UE antenna type index list,
the UE antenna panel index list,
the UE antenna port index list,
Resource Pattern Time Index, RPTI, list,
Resource Pattern Frequency Index, RPFI, list,
Resource Pattern Time Length, RPTL, List,
a transmit power list,
a Frequency hopping—Multihop list,
a Periodicity—Multihop list,
a Demodulation Reference Signal (DMRS)—Multihop-SidelinkConfiguration list,
a TransformPrecoder—Multihop list,
a nrofHARQ-Processes—Multihop list,
a repK-RV—Multihop list,
a repK—Multihop list,
a Powercontrol mode—Multihop list,
a P0—MultiHop-PSSCH-AlphaSet list.

In a further implementation form of the second aspect, the multihop transmission is based on one or more of
a unicast type of multihop transmission,
a multicast type of multihop transmission,
a multiple multihop transmissions comprising subgroup multihop transmissions in the same group of UEs.

A third aspect provides a wireless communication device, UE, configured to in particular send, to a network device or to another wireless communication device, a scheduling request for a multihop transmission; and receive a first message from the network device or the another wireless communication device in response to the scheduling request, wherein the first message indicates one or more sidelink resources and/or sidelink resource allocation information for one or more UEs to perform the multihop transmission.

For example, the sidelink transmissions may be scheduled over the physical sidelink shared channel (PSSCH). Moreover, due to the wireless channel characteristics of the high frequency, sidelink transmissions may also make use of the multi-hop transmissions among the wireless communication device.

In some embodiments, the cluster head may not necessarily send the request. For example, the request may come from another UE.

Moreover, in some embodiments, the scheduling request may not coming from the originating UE, but from any other UE (i.e., that is interested to receive some information). However, the scheduling grant may be for the complete group. For example, in a platoon, one of the UEs may want to receive certain information from another UE, and it may further send the scheduling request to the BS. Furthermore, the scheduling request is sent by a certain receiver and not from a transmitter.

In an implementation form of the third aspect, the wireless communication device is further configured to receive a second message from the network device or another wireless communication device comprising at least one change in the indicated one or more sidelink resources and/or sidelink resource allocation information provided in the first message.

In a further implementation form of the third aspect, the wireless communication device is further configured to determine, when being a cluster head of the group, sidelink resource allocation information for one or more UEs involved in the multihop transmission based on the obtained first message, wherein the first message includes a plurality of sidelink resources; and provide the determined sidelink resource allocation information to the one or more UEs involved in the multihop transmission.

A fourth aspect provides a method for wireless communication device, the method comprising in particular, sending, to a network device or to another wireless communication device, a scheduling request for a multihop transmission; and receiving a first message from the network device or the another wireless communication device in response to the scheduling request, wherein the first message indicates one or more sidelink resources and/or sidelink resource allocation information for one or more UEs to perform the multihop transmission.

In an implementation form of the fourth aspect, the method further comprises receiving a second message from the network device or the another wireless communication device comprising at least one change in the indicated one or more sidelink resources and/or sidelink resource allocation information provided in the first message.

In a further implementation form of the fourth aspect, the method further comprises determining, when being a cluster head of the group, sidelink resource allocation information for one or more UEs involved in the multihop transmission based on the obtained first message, wherein the first message includes a plurality of sidelink resources; and provide the determined sidelink resource allocation information to the one or more UEs involved in the multihop transmission.

A fifth aspect provides a computer program product storing program code for performing, when run by a processor, the method according to the second aspect and/or the fourth aspect and their further implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which FIG. 1 schematically illustrates the network device for receiving the scheduling request and sending the first message, according to various embodiments of the invention.

DETAILED DESCRIPTION OF THE EMBODIMENTS

Figure 1:
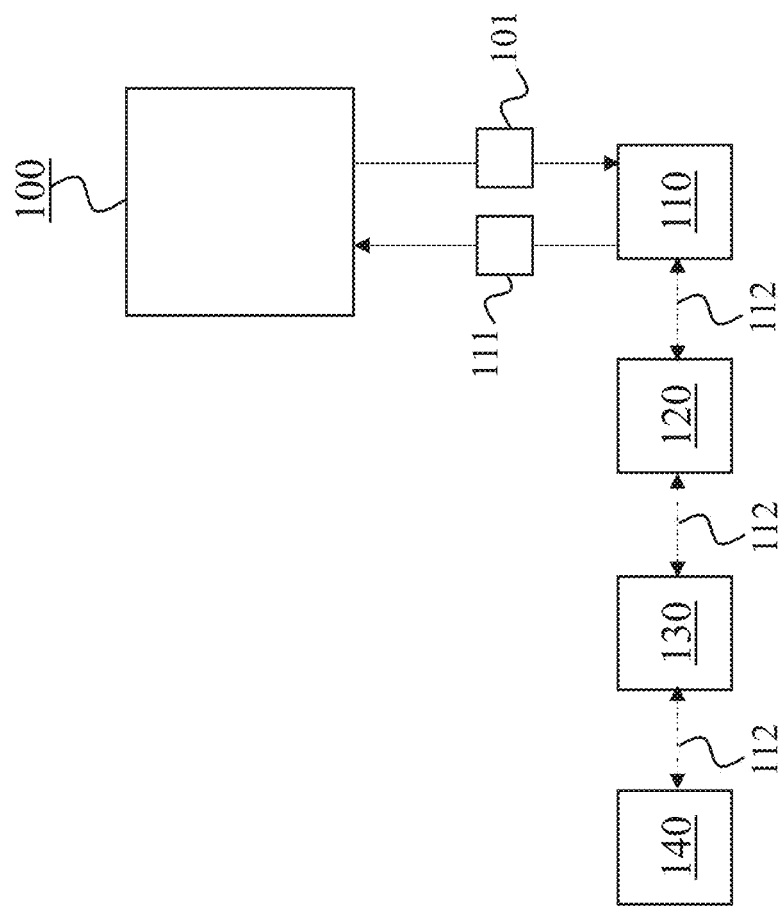

FIG. 1 schematically illustrates the network device 100 for receiving the scheduling request 111 and sending the first message 101, according to various embodiments of the invention.

The BS 100 is configured to receive a scheduling request 111 from a UE 110, in particular for a multihop transmission 112.

The BS 100 is further configured to send a first message 101 to one or more UEs 110, 120, 130, 140 in response to the scheduling request 111, wherein the first message 101 indicates one or more sidelink resources and/or sidelink resource allocation information for the one or more UEs 110, 120, 130, 140 to perform a multihop transmission 112.

For example, the BS 100 may provide the multihop DCI type 1 (MH-DCI type 1) which may comprise a baseline DCI, that may be used by the initially transmitting UE 110. Moreover, the BS 100 may also provide the corresponding resource allocations for the intermediate UEs (e.g., UE2 120 and UE3 130) relative to the baseline DCI (in time and frequency). That is, the reference resource allocation is the one for the originating UE 110.

Moreover, the sidelink resource allocation information may include at least one of the following:
- one or more baseline sidelink resource for one or more UEs of the multihop transmission,
- relative sidelink resource allocation information for one or more UEs of the multihop transmission relative to the baseline sidelink resource,
- one or more additional information for one or more UEs of the multihop transmission.

As discussed, in some embodiments, the follow up allocation updates for the periodic and/or aperiodic services my further be provided, for example, the changes in the sidelink resource allocation compared to the initial resource allocation may be sent.

Figure 2:
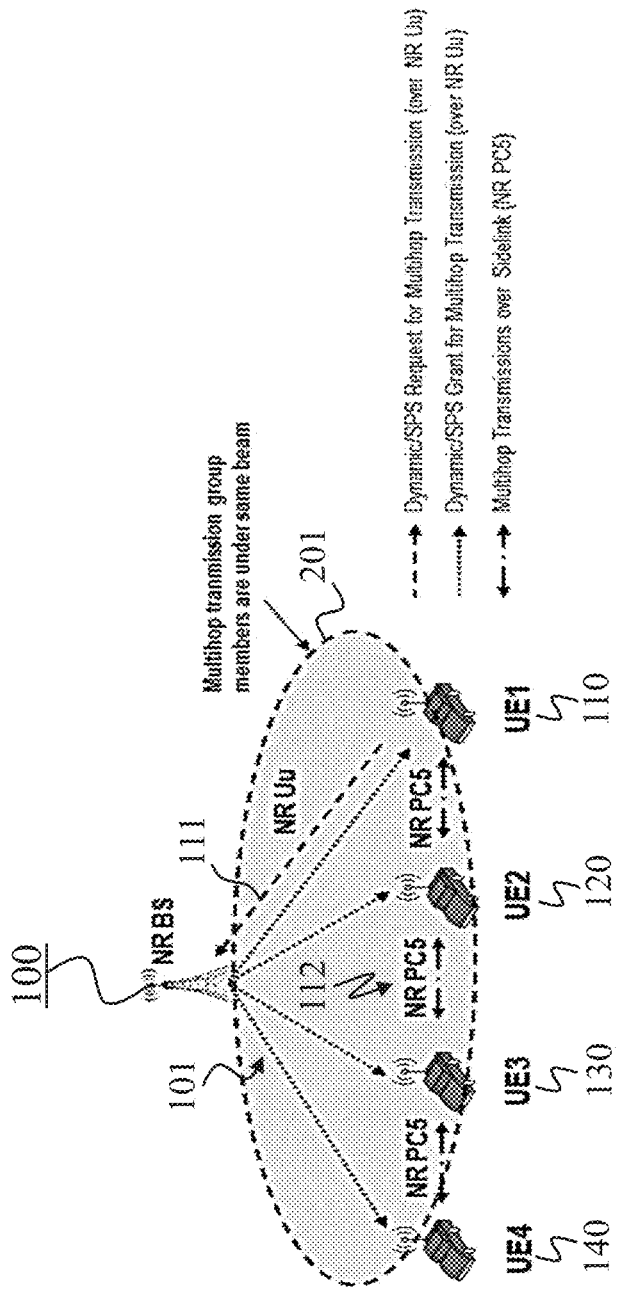
FIG. 2 illustrates an exemplarily scheme for the NR BS-scheduled (NR Uu) multihop transmissions over the NR Sidelink (NR Uu), according to various embodiments of the invention.

FIG. 2 illustrates an exemplarily scheme for the NR BS-scheduled (NR Uu) multihop transmissions 112 over the NR sidelink (NR Uu), according to various embodiments of the invention. Moreover, the UEs 110, 120, 130, 140 are under the same beam 201 controlled by a single BS 100.

FIG. 2 illustrates a basic scenario in which the BS 100 schedules the multihop transmissions 112 over the sidelink (PC5 interface). In this scenario, a UE (e.g., the UE1 110) wants to make a multihop transmission 112 over the sidelink to a certain UE (e.g., the UE4 140) and/or a group of UEs (e.g., UE2 120, UE3 130 and UE4 140) and sends a multihop sidelink scheduling request to the BS 100. The BS 100 prepares a multihop DCI (MH-DCI) for the multihop transmission 112 and sends it to the UEs 110, 120, 130, 140 which will perform the sidelink transmission 112. In this case, the CRC part of the multihop DCI is scrambled with a new RNTI (i.e., Multihop RNTI/MH-RNTI) so that all group members which will perform the multihop transmission 112 may receive it. This new RNTI (i.e., Multihop RNTI I MH-RNTI) may be provided by the BS 100 in advance to the group members with the radio resource control (RRC) signaling so that each UE (e.g., UE1 110, UE2 120, UE3 130 and UE4 140) may search the corresponding MH-RNTI among the received DCI messages. Furthermore, this example scenario also assumes that the group members are served by the same beam 201 of the BS 100. In FIG. 2, since each UE in the group receives the MH-DCI, the UEs (e.g., UE1 110, UE2 120, UE3 130 and UE4 140) not only know where to perform the sidelink transmissions, but also where to perform sidelink receptions. By knowing where to perform the sidelink receptions, UE may generate the corresponding ACK/NACK information. These ACK/NACK information may be sent either directly to the BS 100 and/or to the transmitting UE (e.g., UE1 110). Furthermore, the MH-DCI may also carry additional sidelink resources (could be either for uplink radio resources inside physical uplink control channel (PUCCH) or for sidelink radio resources inside physical sidelink feedback channel (PSFCH) by means of sidelink feedback control information (SFCI) or inside Physical Sidelink Control Channel (PSCCH) or inside PSSCH) for each UE for the transmission of ACK/NACK information.

Figure 3:
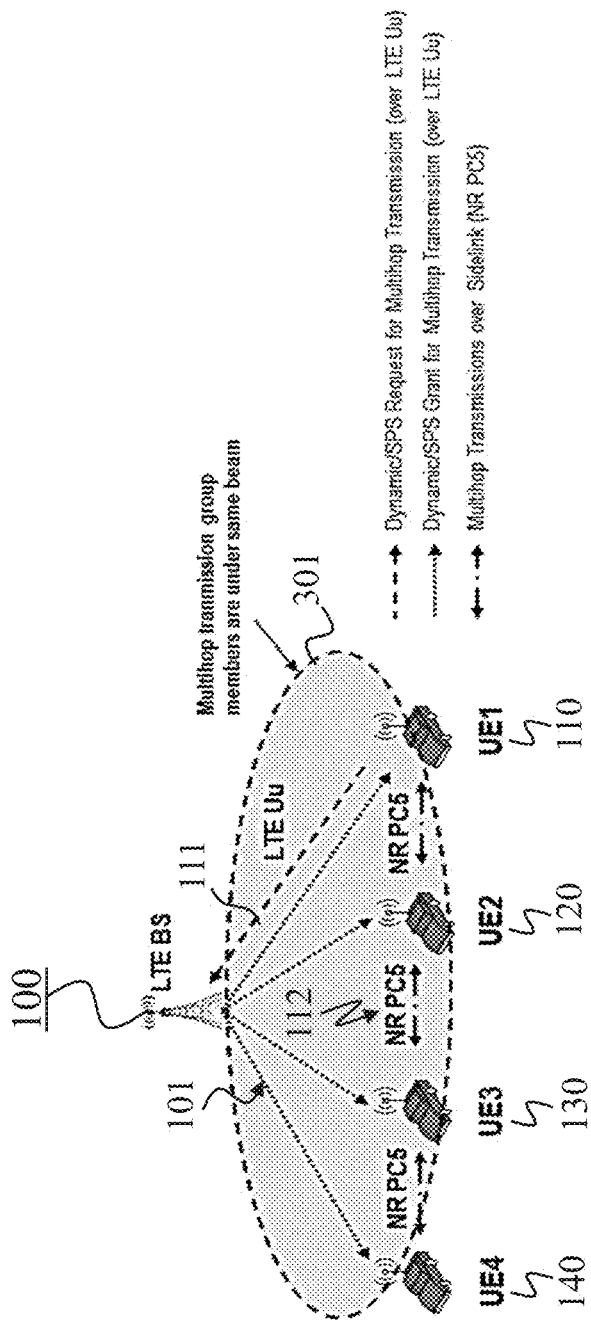
FIG. 3 illustrates an exemplarily scheme for the LTE BS-scheduled (LTE Uu) multihop transmissions over the NR sidelink (NR Uu), according to various embodiments of the invention.

FIG. 3 illustrates an exemplarily scheme for the LTE BS-scheduled (LTE Uu) multihop transmissions 112 over the NR Sidelink (NR Uu), according to various embodiments of the invention. Moreover, the UEs 110, 120, 130, 140 are under the same beam 301 controlled by a single BS 100.

As mentioned above, the DCI Format 5A may include frequency related information (i.e., the lowest index of the subchannel allocation and a resource indication value) of the sidelink transmission as well as implicit timing related information (i.e., the sidelink transmission at a time which starts at least 4 subframes (i.e., 4 ms) after the subframe in which the sidelink grant (i.e., DCI Format 5A) was received). Furthermore, as mentioned above, new DCI (for Uplink/Downlink schedules over the Uu interface) designed for NR also includes new fields for frequency related information (i.e., Frequency domain resource assignment) as well as for time related information (i.e., Time domain resource assignment). Such frequency related information (i.e., Frequency domain resource assignment) and time related information (i.e., Time domain resource assignment) may be also used for BS scheduled sidelink transmissions in the NR (with a new DCI Format). In this case, the new DCI format designed for the BS scheduled sidelink transmissions in NR may include:
- Frequency related information (this could be similar to DCI Format 5A structure):
  - Lowest index of the subchannel allocation
  - Resource indication value
- Time related information (this could be either of the following approaches):
  - Fixed timing relationship similar to Rel. 14 sidelink: Sidelink transmission at a time which starts at least certain subframes and/or slots (i.e., 4 ms) after the subframe and/or slot in which the sidelink grant was received
  - Flexible timing relationship similar to NR Uplink/Downlink operation: Similar to the Time domain resource assignment as specified above.
- Bandwidth partition (BWP) and numerology information Furthermore, if the LTE BS 100 schedules the NR sidelink transmissions 112 via its LTE-Uu interface as shown in FIG. 3, there is also a need for new DCI format as well. In this case, in addition to the above considerations, numerology information (as well as BWP) can be also carried within the new DCI format. This may be needed in LTE BS scheduling case, since in NR BS case, the assigned BWP for sidelink transmissions already includes numerology information; however, such BWP consideration is not available in LTE case.

In some embodiments of this invention, such new DCI format designed for the BS scheduled sidelink transmissions in the NR may be used as a baseline allocation for the Multihop DCI (MH-DCI).

Figure 4:
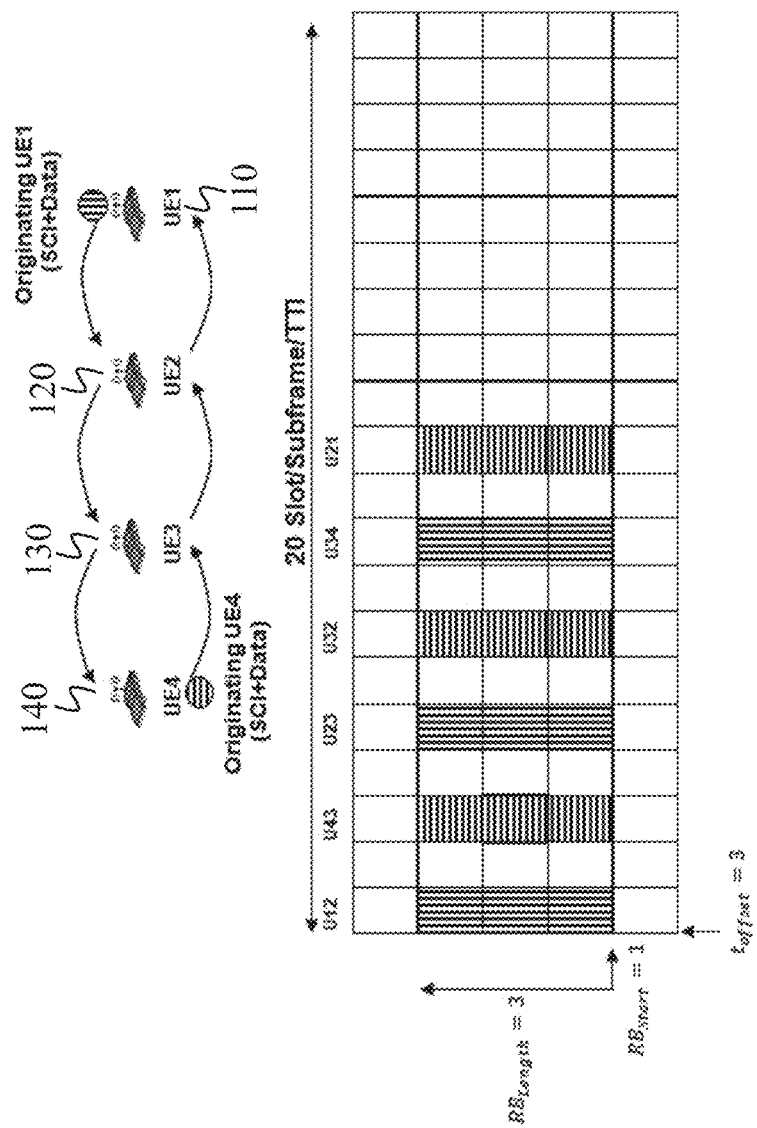
FIG. 4 illustrates an exemplarily scheme for the sidelink multihop transmission schedules of two originating UEs, according to various embodiments of the invention.

FIG. 4 illustrates an exemplarily scheme for the sidelink multihop transmission schedules of two originating UEs (UE1 110 and UE4 140), according to various embodiments of the invention. Moreover, the same RBs in frequency domain are used at different time slots (e.g., subframes).

FIG. 4 shows a multihop scenario in which two UEs (the UE1 110 and the UE4 140 which are referred to as originating UEs) are exchanging data over the sidelink. In this scenario, the intermediate UEs (the UE2 120 and the UE3 130) may relay the sidelink data including the control information (i.e., the sidelink control information (SCI)) originated either by the UE1 110 or the UE4 140 to the final UE (for example, in FIG. 4, the U12 means that the UE1 110 is transmitting to the UE2 120 over the sidelink and so on). In some embodiment, three resource blocks (RBs) (starting from RB number 1) may be assigned in the frequency direction for each transmission with certain time offset (i.e., time-offset ($t_{offset}$)=3 for the UE1 110 and the $t_{offset}$=5 for the UE4 140) by the BS 100. In this example, one assumption is that the BS 100 already knows about the group information such as, the group members and their respective IDs (e.g., ProSe IDs, Layer-2 IDs or Layer-1 IDs) which may be selected as source or destination IDs (e.g., ProSe Destination IDs, Layer-2 Destination IDs or Layer-1 Destination IDs) by the BS 100. Moreover, the group information may be obtained, e.g., via a group management function implemented in an application function (AF) or application server (AS) in the 3GPP network. For example, a group may be formed for a specific service, e.g., a V2X platooning service. Another approach may be, for example, the originating UEs may provide this information in their multihop sidelink scheduling request information. In the example shown in FIG. 4, the UE1 110, when sending multihop sidelink scheduling request to the BS 100, may also include the destination information (i.e., the UE4 140) as well as the intermediate UE information (i.e., the UE2 120 and the UE3 130) in the request message in one option. In another option, the originating UE may not know the intermediate UEs that are required to perform the multihop transmission and the multihop sidelink scheduling request may not have such information. In this case, the BS 100 may determine the intermediate UEs that are required to perform the multihop transmission.

Furthermore, it is also important to consider that, in some embodiments, there may be a unicast type of multihop transmission (i.e., the intended receiver is only one and the final UE in the multihop transmission path is the intended receiver) or a multicast type of multihop transmission (i.e., the intended receiver is more than one and any intermediate UE including the final UE in the multihop transmission path is the intended receiver (s). For example, if the multihop transmission is a multicast type, then it is reasonable to consider that the BS 100 when selecting the intermediate UEs, it may also check and/or consider whether the selected intermediate UEs cover the complete multicast group. Moreover, in some embodiments, there may be multiple multihop transmissions (i.e., multiple MH-DCIs) in one multihop group. As shown in FIG. 4, the UE1 110 as well as the UE4 140 may perform different multihop transmissions in the same group.

In this case, the Multihop DCI (MH-DCI) content may be prepared by the BS 100 for each originating UE as follows:
  Baseline Allocation for originating UE (e.g., DCI Format 5A for UE1 110)
    Carrier indicator
    Lowest index of the subchannel allocation of the initial transmission
    Frequency resource location of initial transmission and retransmission, indicated by a resource indication value (RIV)
    Time gap between initial transmission and retransmission.
    SL SPS configuration index (SPS case)
    Activation/release indication (SPS case)
  UE transmitter list: The list of relaying UEs (e.g., [UE2 120, UE3 130]) are selected as for relaying of the UE1 110 sidelink data to the UE4 140)
  Resource Pattern Time Index (RPTI) List: The list of slot time indexes relative to the baseline allocation timing (e.g., [4, 8] means the UE2 120 may relay the information 4 time slots later compared to reception time of the UE1 110 and the UE3 130 may relay the information 8 time slots later compared to the reception time of the UE1 110).

In the above example, the relaying UEs may use the same RBs in the frequency domain assigned in the baseline allocation to the originating UE. Furthermore, if the retransmission is activated with Multihop DCI message, the retransmission strategy (including the time/frequency resources) may be configured, for example, in advance and such that each UE may decide retransmission strategy based on the initial transmission grant received in the Multihop DCI message. Another approach may be to use a dynamic approach in which all retransmission strategy information is also provided within the initial transmission grant received in the Multihop DCI message (i.e., retransmission grant).

Figure 5:
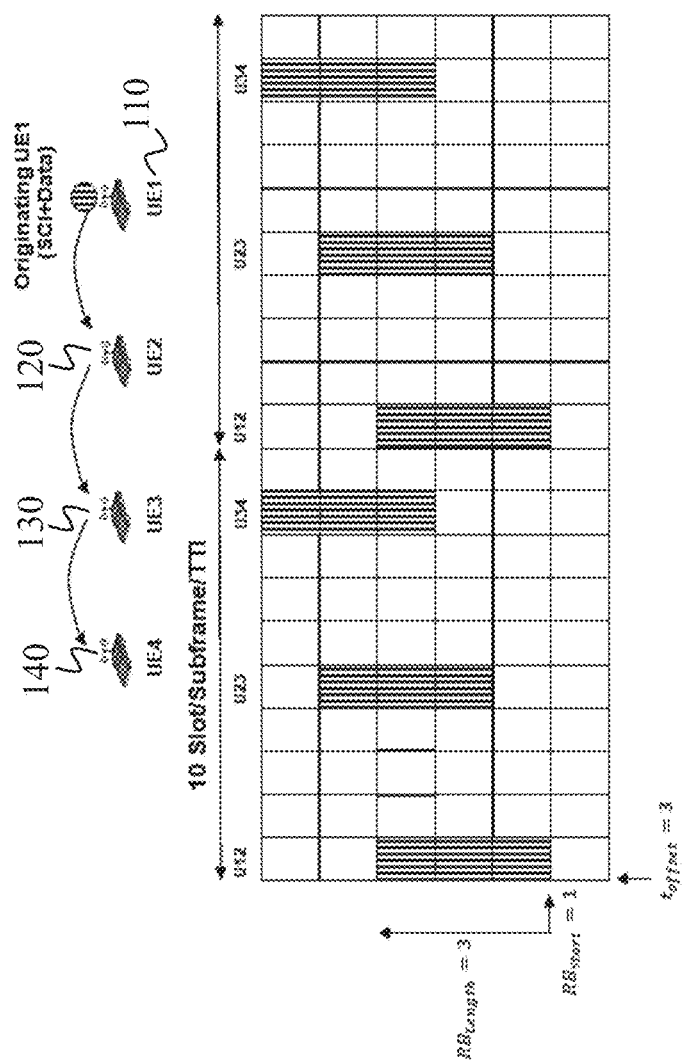
FIG. 5 illustrates an exemplarily scheme for the sidelink multihop transmission schedules of one originating UE (UE1) including different RBs for each hop, according to various embodiments of the invention.

FIG. 5 illustrates an exemplarily scheme for the sidelink multihop transmission schedules of one originating UE (UE1 110) including different RBs at different time slots for each hop, according to various embodiments of the invention.

FIG. 5 shows an example of the allocation of different RBs at different time slots for different UEs for each hop, which may be managed by the following options:
  Resource Pattern Frequency Index (RPFI) List: The list of RB allocations relative to the base RB allocation for each multihop (e.g., [1 2] means the first hop UE may relay the information one RB above the base RB allocation and the second hop UE may relay the information two RBs above the base RB allocation). The frequency allocation may be on a subchannel basis as well in addition to RB allocation depending on the granularity of the allocation size.

Figure 6:
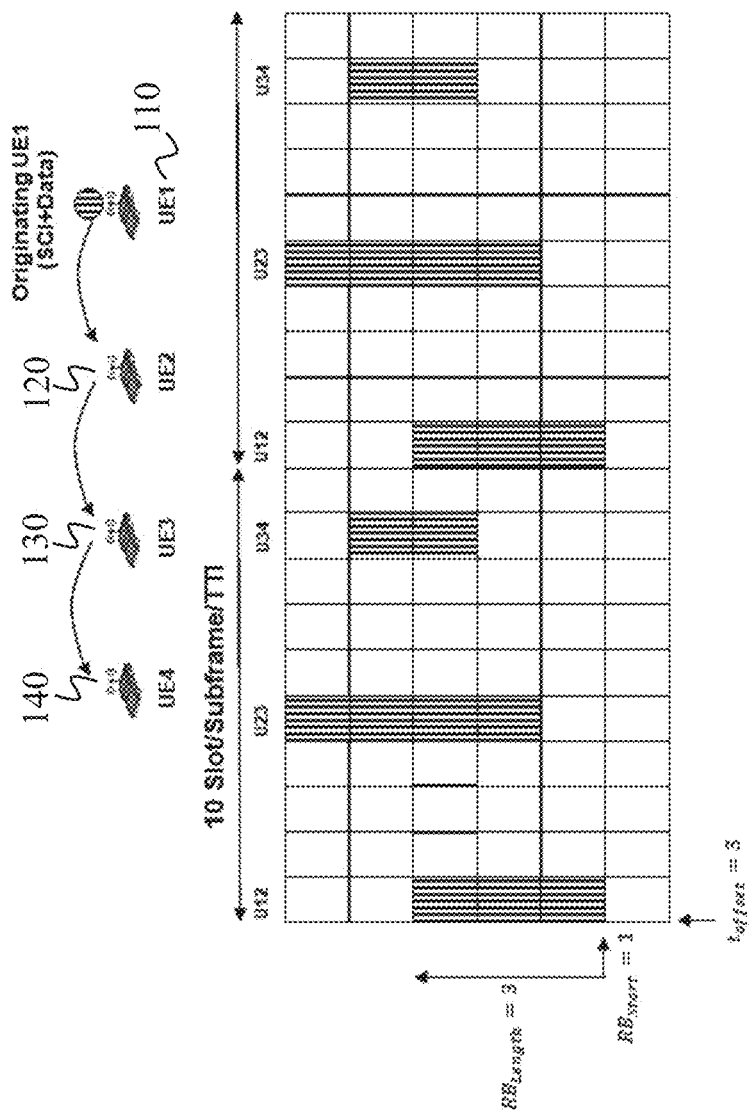
FIG. 6 illustrates an exemplarily scheme for the sidelink multihop transmission schedules of one originating UE (UE1) including different RBs and different RB sizes for each hop, according to various embodiments of the invention.

FIG. 6 illustrates an exemplarily scheme for the sidelink multihop transmission schedules of one originating UE (UE1) including different RBs and different RB sizes for each hop, according to various embodiments of the invention.

For example, allocation of different RBs and different RB sizes for different UEs for each hop may be managed by the following options:
  Resource Pattern Frequency Length (RPFL) List: RPFL is the length of the PRB assigned to the first and the follow up hops which may use the baseline RB allocation as reference allocation. In this case, [1−1] means that the first hop UE may relay the information with one more RB compared to the base RB allocation size (i.e., 4 RBs) and the second hop UE may relay the information with one less RB below the base RB allocation (i.e., 2 RBs).

In some embodiments, the multihop DCI size considerations and blind decoding complexity may be provided. For example, in order to reduce the blind decoding complexity (e.g., in some embodiments of this invention), the following two different approaches may be considered.
  Approach 1: in some embodiments, a new Radio Resource Control (RRC) message may be defined for informing the UEs about the actual size that may be used for the multihop DCI in that specific group. Since the number of group members (i.e., number of intermediate UEs performing the multihop transmissions) may be different in different scenarios, different multihop DCI sizes may be used. Moreover, since the UE is informed by the BS via the RRC message about the actual size of the MH-DCI (s), it may search only that size for the MH-DCI (s).
  Approach 2: in some embodiments, a fixed size of Multihop DCI may be predefined and preconfigured at the UEs. Depending on the need, the BS may create single or multiple Multihop DCI messages for a multihop group considering the fixed size. Moreover, if the information content is less than fixed Multihop DCI size then the BS may additionally perform padding. Furthermore, BS may also transmit some parts of the information related to multihop transmission via the RRC signaling instead of the Multihop DCI. For example, there may be a situation in which one parameter (relevant for the multihop group) may be transmitted via the RRC message since one Multihop DCI message is already reached the limit (i.e., one fixed size Multihop DCI is occupied).

In some embodiments, enhancements of the multihop DCI (MH-DCI) may further be provided. For example, in addition to the above features, the following enhancements may be also applied to the Multihop DCI.

In some embodiments, the multi-beam based transmission support over the Uu interface may be provided. In some embodiments, all group members may be in the same beam so that one multihop DCI transmission by the BS may be enough. Moreover, in some embodiments, the group members may be in multiple beams.

Figures 7A, 7B:
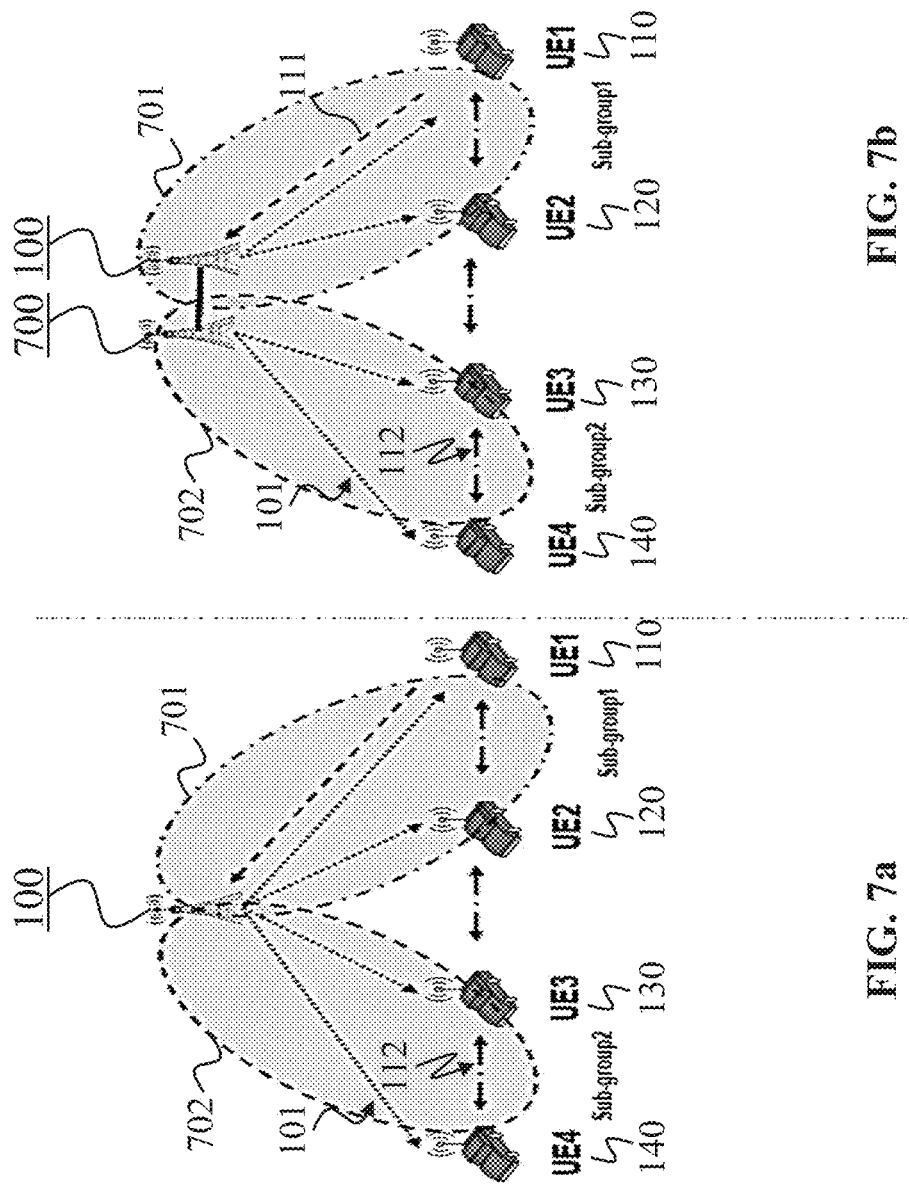
FIG. 7a and FIG. 7b illustrates exemplarily schemes for the sidelink multihop transmissions considering multi-beam based transmission with the BS using single BS and two-BS control, respectively, according to various embodiments of the invention.

FIG. 7a and FIG. 7b illustrates exemplarily schemes for the sidelink multihop transmissions considering multi-beam based transmission with the BS, using single BS (FIG. 7a) and two-BS control (FIG. 7a), respectively, according to various embodiments of the invention.

FIG. 7a and FIG. 7b exemplary illustrate two multi-beam based transmissions, namely a single BS and two-BS control, respectively. In this scenario, since different beams 701, 702 are supporting the same multihop group, multihop DCI (with agreed multihop group RNTI with the BS(s) and the sub-group UE members) may be transmitted by each beam 701, 702 to its connected UEs (i.e., the sub-group UE members, e.g., beam 701 transmitted to UE1 110 and UE2 120 and beam 702 is transmitted to UE3 130 and UE4 140). Moreover, when two BSs 100, 700 are controlling the multihop group, these BSs 100, 700 should coordinate (e.g., when deciding on MH-DCI parameters) over the X2 and/or the Xn interface and/or any other interface enabling communication between the two BSs 100, 700. Furthermore, if a UE is in the beam edge of a BS, the neighboring BS may also create a beam for that UE in order to increase the reception quality of the UE. In this case, Both beams directed to a common UE may use the same time/frequency RBs and send the same multihop DCI information.

Both beams directed to a common UE may use different time/frequency RBs and send the same multihop DCI information.

Figure 8:
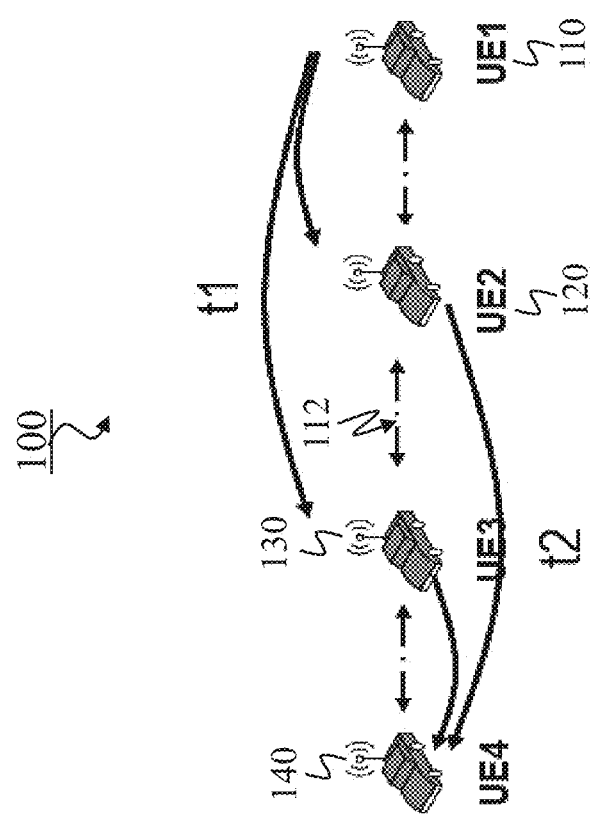
FIG. 8 illustrates an exemplarily scheme for the sidelink multihop transmissions considering UE cooperation, according to various embodiments of the invention.

In some embodiments, a UE cooperation over sidelink transmission may be performed. FIG. 8 illustrates an exemplarily scheme for the sidelink multihop transmissions considering UE cooperation, according to various embodiments of the invention.

In some embodiments, depending on the wireless channel conditions and the UE antenna positions, some intermediate nodes may perform simultaneous transmissions, for example, in order to increase the reliability of the message. For instance, as shown in FIG. 8, the BS 100 may decide on the simultaneous transmission by the UE2 120 and the UE3 130. In this case, when the UE1 110 performs the initial transmission, both UEs (the UE2 120 and the UE3 130) may receive the sidelink data correctly (e.g., since the gNB may know wireless channel conditions between (the UE1 110 and the UE2 120) and (the UE1 110 and the UE3 130) are acceptable to receive the initial transmission from the UE1 110). In this case, the RPTI may be selected as [5 5] and the UE transmitter list may be [UE2 and UE3].

In some embodiments, different antenna types for sidelink multihop transmission may be used. For example, the UEs (e.g., vehicles aka VUEs) may have different communication antennas at different physical locations and which may work at different frequencies. Moreover, the UEs may report the wireless channel characteristics of each antenna type to the BS 100 so that when the BS 100 use multi-hop trans-mission capability, it may make use of such information. In each hop, the BS 100 may also inform the transmitting UE about the antenna configuration to be used for the sidelink transmission. The antenna types may be bumper type (type 1), mirror type (type 2), rooftop type (type 3), etc. Furthermore, each antenna type may have multiple antenna ports which may be also further used and mapped to certain physical antenna. In this case, the following options may be provided in the multihop DCI:

UE antenna type index list
UE antenna port index list

Furthermore, if the BS 100 determines that each transmitter in the multihop group uses the same antenna types and ports then it may also limit the entries in the MH-DCI:

single entry in the UE antenna type index list
Single entry in the UE antenna port index list In some embodiments, different carrier indicator information for multihop sidelink transmission may be used. For example, there may be embodiments where different carriers may be used for each transmitter in the multihop transmission. Moreover, this information may also be explicitly transmitted in the MH-DCI. In this case, the following option in the multihop DCI may be provided:

Carrier indicator index list

In some embodiments, different modulation and coding scheme (MCS) as well as symbol-wise allocations for sidelink transmission may be used.

Furthermore, each sidelink transmission per hop may use different MCSs. In this case, MCS indicator may be explicitly sent, as well, in the MCS index list in the multihop DCI message. Additionally, each sidelink transmission per hop may also use the Start and Length Indicator Value (SLIV) as currently defined for the NR Uu interface. In this case, the SLIV may be explicitly sent as well in the SLIV list in the multihop DCI message.

In some embodiments, once the initial multihop DCI allocation is transmitted to the multihop group, the follow up allocation updates for the periodic and/or the aperiodic services may be performed by the BS. Moreover, the overhead may further be reduced by only sending the changes compared to the initial multihop DCI allocation.

Figure 9:
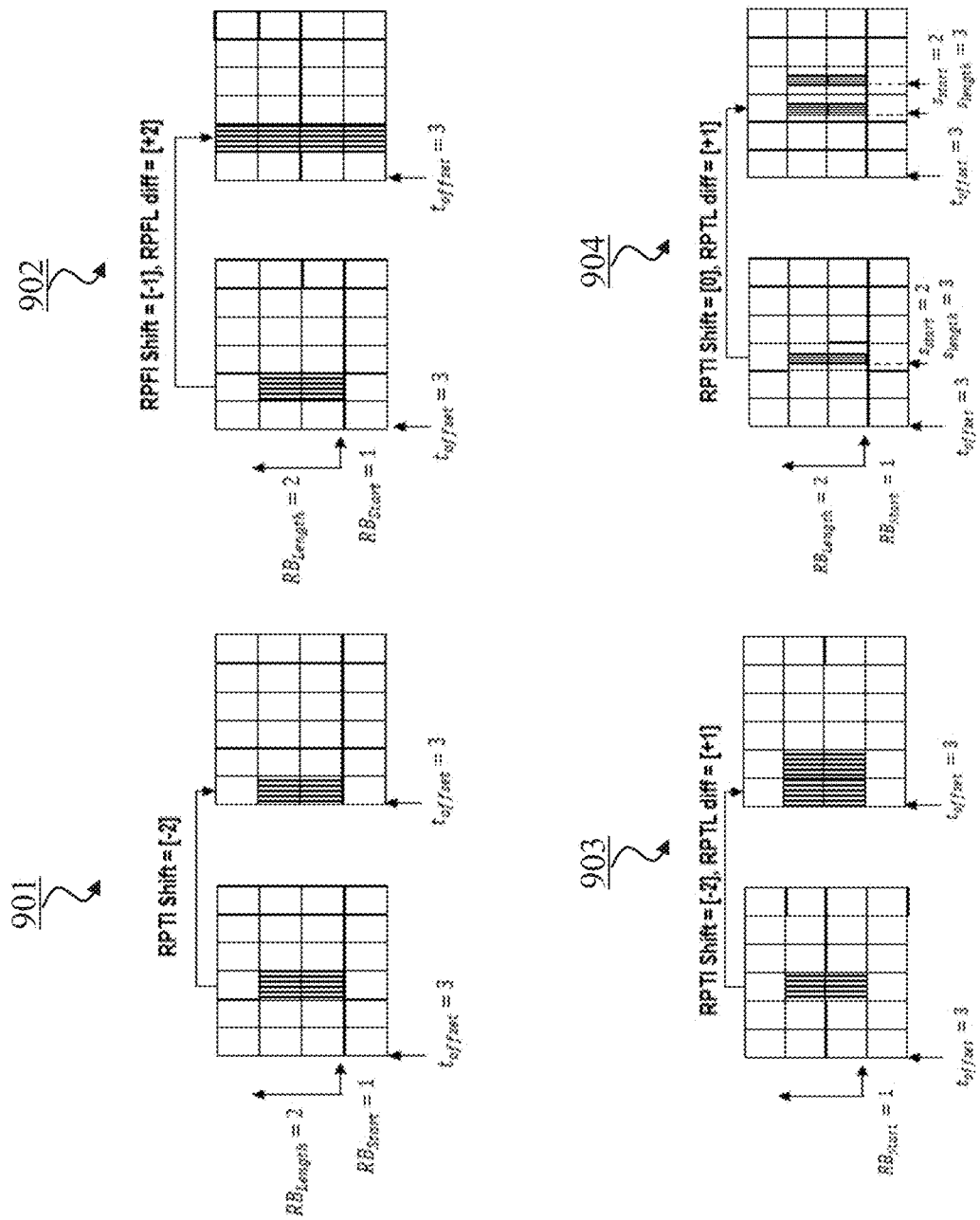
FIG. 9 schematically illustrates the follow-up sidelink multihop transmission updates, according to various embodiments of the invention.

FIG. 9 schematically illustrates the follow-up sidelink multihop transmission updates, according to various embodiments of the invention.

The follow-up sidelink multihop transmission updates may include the time updates, e.g., in 901 and 903 and/or the frequency updates 902 and/or the length update, e.g., 903 and 904.

FIG. 9 shows the RPTI shift 901 as well as the RPFI shift and the RPFL difference 902. In the RPTI shift 901 example, the transmission time is shifted 2 time slots/subframes/TTIs earlier compared to the initial allocation. In the RPFI and RPFL example 902, the RB allocation is shifted 1 RB below (i.e., RPFI shift=−1) and incremented 2 RBs (i.e., RPFL diff=+2) compared to the initial allocation.

Furthermore, the RPTL length may change in the follow up allocation updates, as it is shown in 903 and 904.

In 903, the RPTI shift [−2] and RPTL diff [+1] means the relative change shifts the resource allocation 2 time slots in advance compared to the first allocation and increments the timeslot allocation length by one (i.e., 2 consecutive time slots are aggregated).

Furthermore, similar approach may also be used for symbol wise allocation. In 904, certain SLIV value (e.g., starting symbol allocation is 2, allocation length=3) may be used to indicate the initial allocation at the symbol level and follow up allocation may use the same SLIV value with new RPTI and RPTL setting.

In some embodiments, the BS may decide to use the MH-DCI without considering relative radio resource allocation (i.e., the follow up radio resource allocations relative to the baseline radio resource allocation).

In some embodiments, it may be possible that the BS perform regular time and/or frequency radio resource allocation for each transmitter in the multihop transmission in the MH-DCI, for example, without considering the relative allocations. In this case, the main overhead reduction may be limited to, e.g., removing of some additional parameters in the MH-DCI message. For example, any of the following parameters may be sent only once in the MH-DCI:

Carrier indicator

SL SPS configuration index (SPS case)

Activation/release indication (SPS case)

In some embodiments, the relativity among time/frequency radio resource allocations of different transmitters in multihop transmission may be considered.

As discussed above, one option of relative radio resource allocation is to consider the baseline allocation as a reference point and provide the information of time and/or the frequency of other radio resource allocations based on that reference point. Another option may be to use the previous allocation defined in the MH-DCI as a reference point. In that case, each allocation uses the previous allocation as a baseline. In both cases, the overhead in the time and frequency direction may be reduced.

Figure 10:
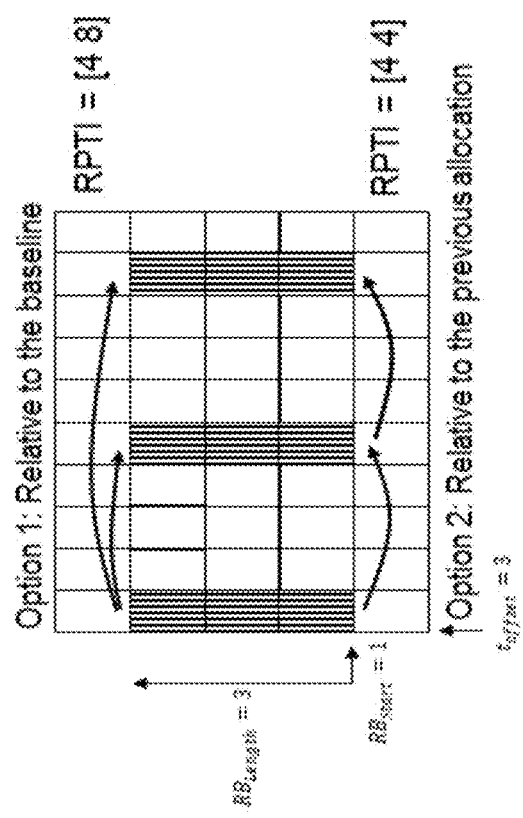
FIG. 10 schematically illustrates usage of different reference points when defining relative allocations, according to various embodiments of the invention.

FIG. 10 schematically illustrates usage of different reference points when defining relative allocations, according to various embodiments of the invention.

FIG. 10 shows two options in time direction. Moreover, the same procedure may be also applied in frequency direction and/or the symbol level allocation case (i.e., usage of the SLIV with different reference points).

Figure 11:
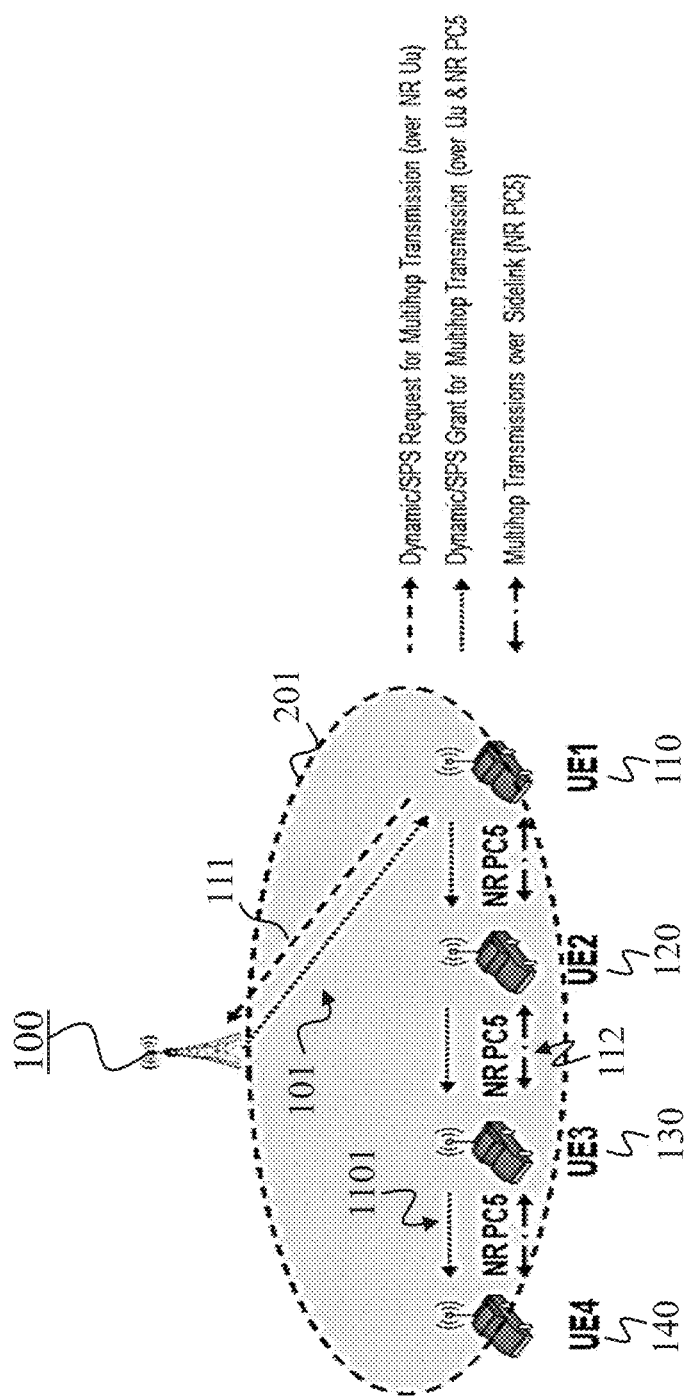
FIG. 11 illustrates an exemplary scheme for the BS-scheduled (Uu) multihop transmissions over the NR Sidelink including the cluster head connection, according to various embodiments of the invention.

FIG. 11 illustrates an exemplary scheme for the BS-scheduled (Uu) multihop transmissions over the NR Sidelink including the cluster head connection, according to various embodiments of the invention. Moreover, there may be only the cluster head connection to the BS.

In some embodiments, a Cluster Head (CH) connection option may be provided. For example, only the cluster head (e.g., the platoon head) may have a connection to the BS and the cluster head may manage the sidelink multihop communication on behalf of the multihop group, e.g., as it is shown in FIG. 11. In this case, two subcases may be considered. In the first subcase, UE1 110 (i.e., the cluster head) may know the sidelink transmission needs of the multihop group (i.e., the UE1 110 may know the group members of the multihop group and their sidelink transmission needs based on the service type information) and prepare the multihop sidelink scheduling request (i.e., the dynamic or the SPS (e.g., configured grant type 2 in the NR)) on behalf of the multihop group and may further send it to the BS 100. UE1 may additionally specify the group ID, the service type, number of the UEs in the group (and their UE IDs) in the multihop sidelink scheduling request message in addition to regular session request (i.e., Buffer status report (BSR) in the case of dynamic scheduling and the SPS activation request in the case SPS for each transmitter in the multihop transmission). BS 100 may also get in advance the group information (Group ID, List of UE IDs) from application function or application server from the core network or the 3$^{rd}$ party server. Moreover, after BS 100 receives the session request message for the multihop transmission 112, it may determine (e.g., prepare) a MH-DCI message including the parameters mentioned above and provides the MH-DCI message to the cluster head (UE1 110). After UE1 110 receives the multihop sidelink scheduling grant for the multihop group, it may also distribute the respective grants 1101 in the group to the respective UE via sidelink (PC5) interface. As it is shown in FIG. 11, after UE1 110 receives the multihop sidelink scheduling grant from the BS 100, it distributes the grants 1101 to UE2 120, UE3 130 and UE4 140. In one option, the CH may sent the complete MH-DCI to the other UEs (i.e., all UEs may receive the same information carried in complete MH-DCI) and each UE may search its own information within the MH-DCI. In another option, the CH may check the information of each UE in the MH-DCI, and it may further distribute the respective information to each UE with another form of the DCI similar to the baseline allocation (i.e., in this case each UE may receive the baseline allocation including information relevant to itself).

In the second subcase, the cluster head (UE1 110) may send the multihop sidelink scheduling request message (which may include the group ID, the service type, number of the UEs in the group) to the BS 100. In return, the BS 100 may provide a sidelink radio resource pool to the cluster head (UE1 110) and the cluster head (UE1 110) may manage the sidelink radio resource pool and it may further prepare the dedicated sidelink transmission resources for each multihop transmission (i.e., for the originating UE and the intermediate UEs in the multihop group). In this case, a new type of multihop sidelink scheduling request (e.g., it may be called as MH-SSR type 2 since it is sent by a UE to cluster head (UE1) over sidelink and the content of this request may be similar to a regular multihop sidelink scheduling request (dynamic or SPS scheduling request)) needs to be defined since it is sent by each group member to the cluster head (UE1 110) (instead of Base Station) over sidelink and the cluster head may directly prepare a Multihop DCI for a specific originating UE in the group and it may further transmit the Multihop DCI to the group of UEs (including the originating UE and the intermediate UEs) over the sidelink. The Multihop DCI grant (similar to above cases) may be for dynamic scheduling or SPS scheduling.

Figure 12:
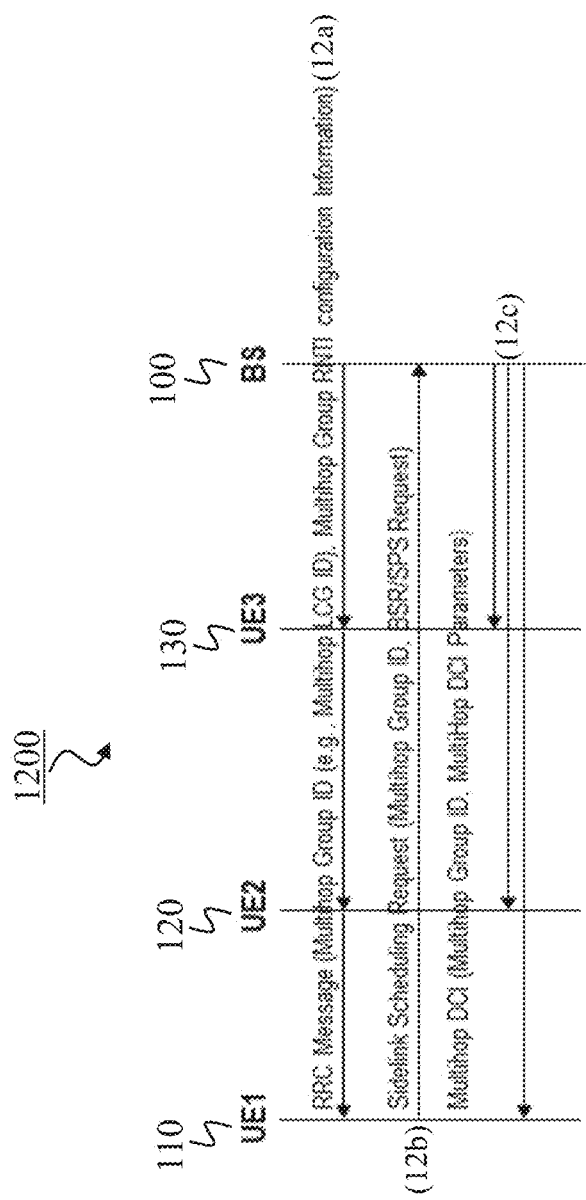
FIG. 12 illustrates a flow diagram of a procedure for signaling between the UE and the BS for the BS-scheduled sidelink multihop transmission including the initial resource allocation, according to various embodiments of the invention.

FIG. 12 illustrates a flow diagram of a procedure 1200 for signaling between the UE and the BS for the BS-scheduled sidelink multihop transmission including the initial resource allocation, according to various embodiments of the invention.

FIG. 12 shows an example of signaling exchange between the UEs 110, 120, 130 and the BS 100 for initial sidelink resource allocation.

In the first step 12a, the BS 100 initially configures the Multihop RNTI value for a certain V2X service (e.g., platooning) in a multihop group via the RRC signaling.

In the second step 12b, the UE1 110 sends a multihop sidelink scheduling request (e.g., BSR or SPS activation request (e.g., a request for configured grant type 2 in NR)) to the BS 100 for the multihop transmission. The BS 100 allocates the respective resources and prepares a Multihop DCI for the group.

In the third step 12c, the BS 100 sends the multihop sidelink scheduling grant (i.e., Multihop DCI in which the CRC part is encoded with Multihop RNTI) which is decoded by all group members of the multihop group. It may also be possible that the originating UE (i.e., UE1 110) may also update the multihop sidelink scheduling request by sending another multihop sidelink scheduling request. This message in turn may trigger another Multihop DCI transmission by BS 100 to the group.

Figure 13:
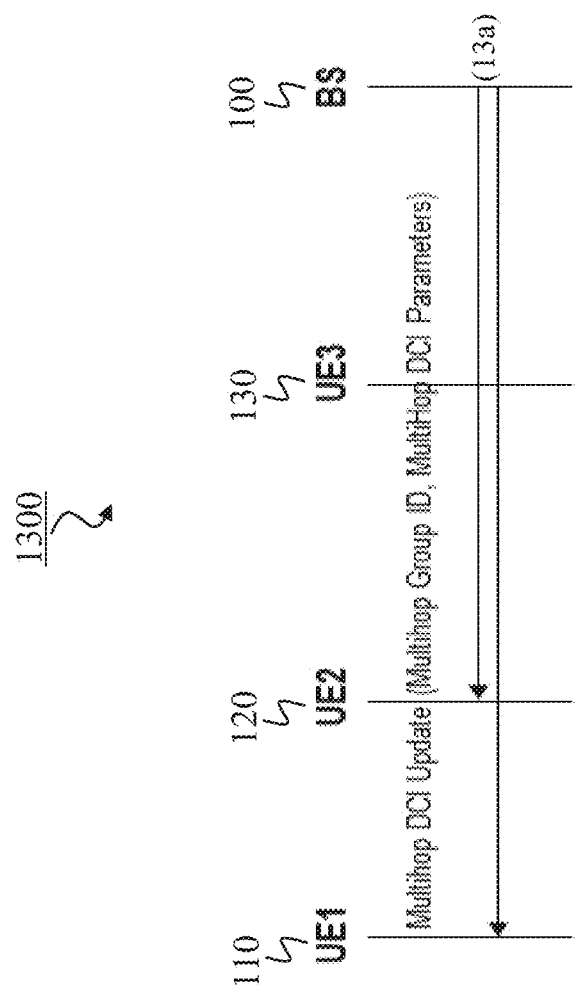
FIG. 13 illustrates a flow diagram of a procedure for signaling between the UE and the BS for the BS-scheduled sidelink multihop transmission including the follow up resource allocation update, according to various embodiments of the invention.

FIG. 13 illustrates a flow diagram of a procedure 1300 for signaling between the UE and the BS for the BS-scheduled sidelink multihop transmission including the follow up resource allocation update, according to various embodiments of the invention.

FIG. 13 shows an example of signaling exchange between the UEs 110, 120, 130 and the BS 100 for follow up sidelink resource allocation update. In this example, at step 13*a*, the BS 100 decides on the resource allocation update of UE1 110 and UE2 120 and transmits the Multihop DCI Update message to the group. The message may be received by all group members but it has only information for UE1 110 and UE2 120. This information may be time slot change and/or resource block (RB) change and/or MCS change information for the respective UE.

Figure 14:
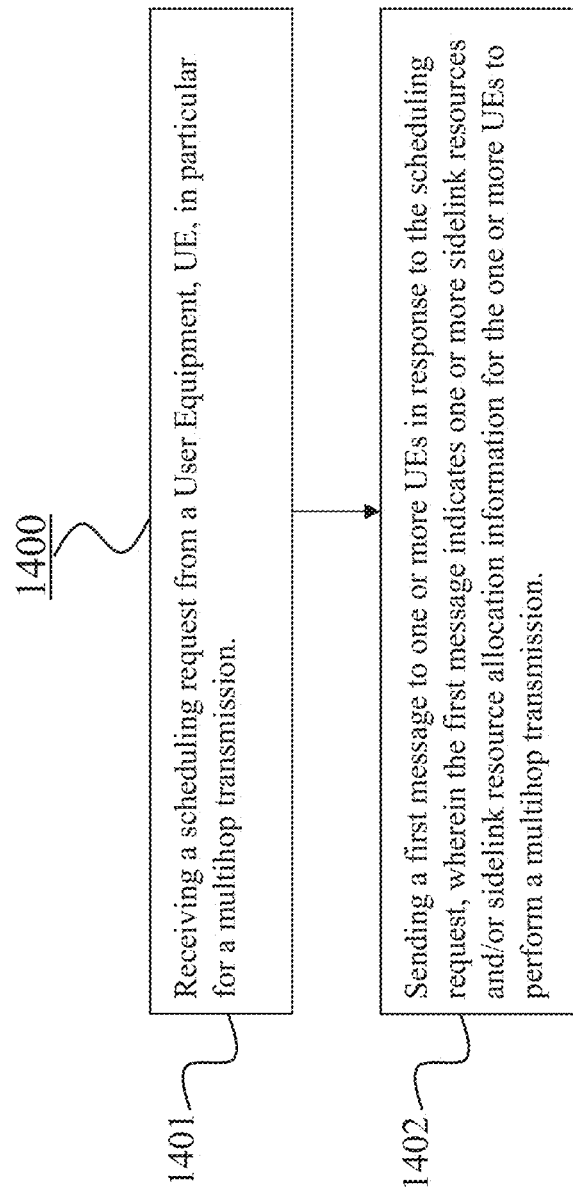
FIG. 14 schematically illustrates a method for the network device, according to various embodiments of the invention.

FIG. 14 shows a method 1400 according to an embodiment of the invention for the network device 100. The method 1400 may be carried out by the network device 100, as it described above.

The method 1400 comprises a step 1401 of receiving a scheduling request 111 from a User Equipment, UE 110, in particular for a multihop transmission 112.

The method 1400 further comprises a step 1402 of sending a first message 101 to one or more UEs 110, 120, 130, 140 in response to the scheduling request 111, wherein the first message 101 indicates one or more sidelink resources and/or sidelink resource allocation information for the one or more UEs 110, 120, 130, 140 to perform a multihop transmission 112.

Figure 15:
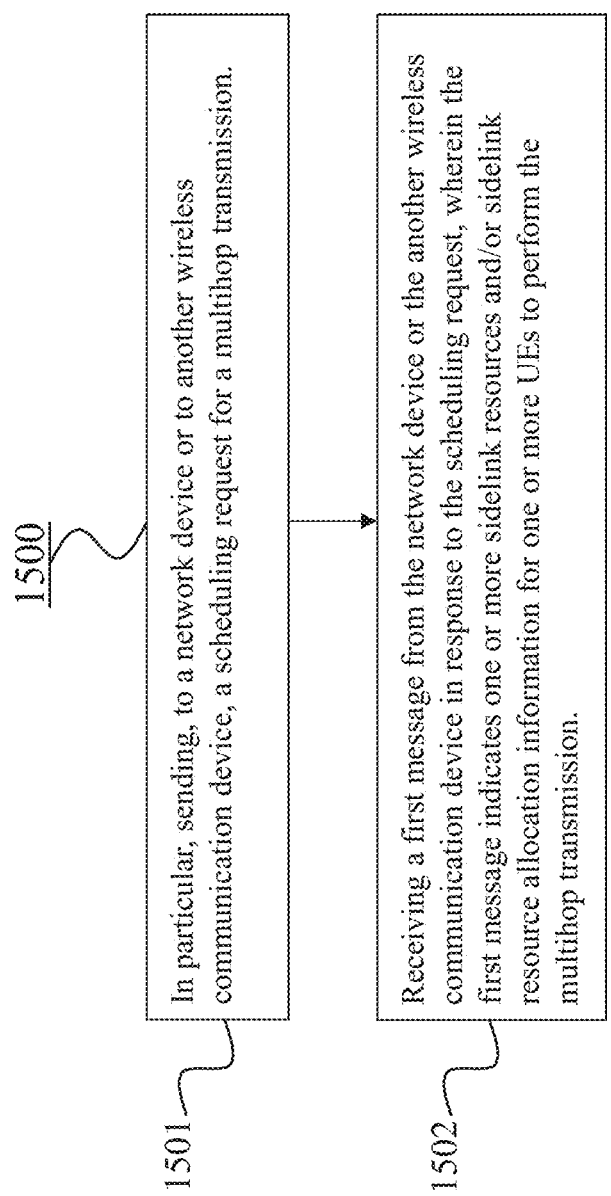
FIG. 15 schematically illustrates a method for the wireless communication device, according to various embodiments of the invention.
Figure 16:
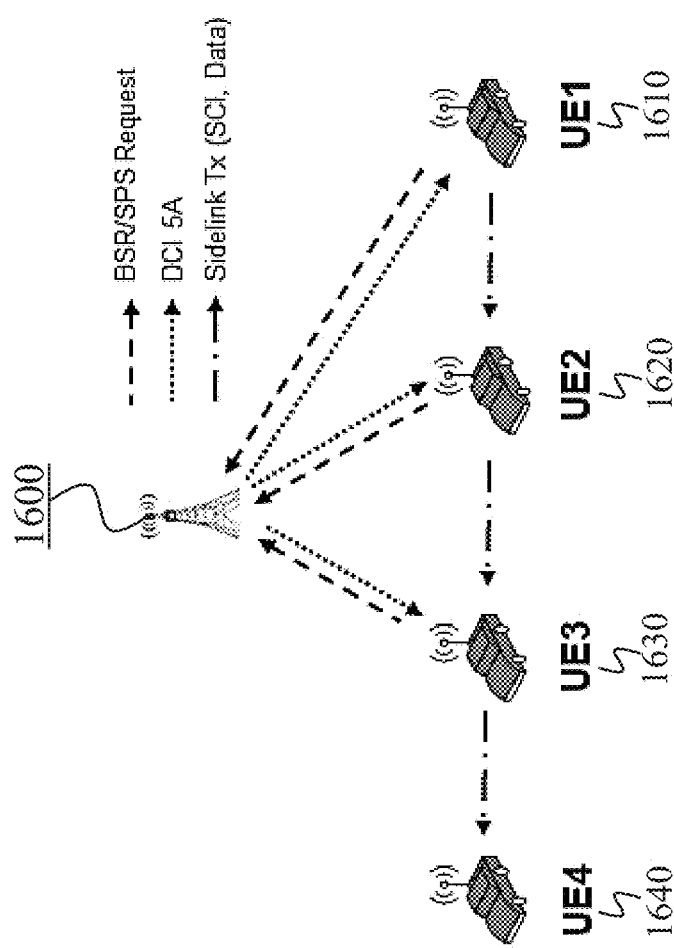
FIG. 16 schematically illustrates a base station scheduled multihop transmission over the sidelink, according to prior art.
Figure 17:
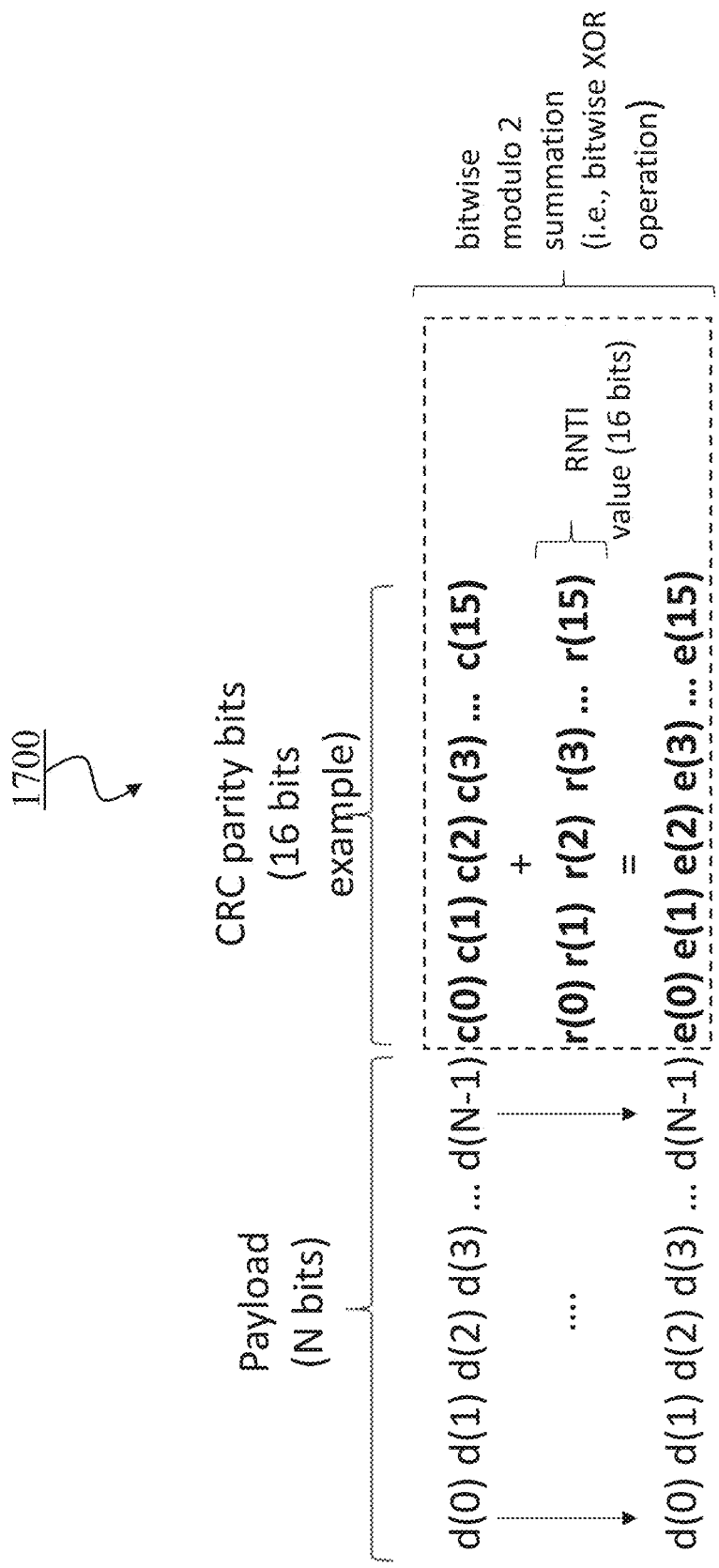
FIG. 17 schematically illustrates a conventional radio network temporary identifiers operation, according to prior art.
Figure 18:
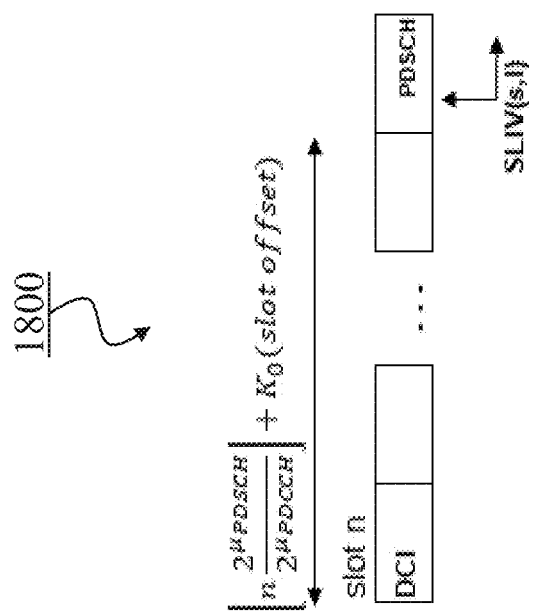
FIG. 18 schematically illustrates an exemplarily time domain resource assignment for the PDSCH transmission ($K_0$), according to prior art.

FIG. 15 shows a method 1500 according to an embodiment of the invention for the wireless communication device 110. The method 1500 may be carried out by the wireless communication device 110, as it described above.

The method 1500 comprises a step 1501 of in particular, sending, to a network device 100 or to another wireless communication device 120, 130, 140 a scheduling request 111 for a multihop transmission 112.

The method 1500 further comprises a step 1502 of receiving a first message 101 from the network device 100 or the another wireless communication device 120, 130, 140 in response to the scheduling request 111, wherein the first message 101 indicates one or more sidelink resources and/or sidelink resource allocation information for one or more UEs 120, 130, 140 to perform the multihop transmission.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A method for a network device, comprising:
   receiving a scheduling request from a User Equipment (UE); and
   sending a first message to one or more UEs in response to the scheduling request, wherein the first message indicates sidelink resource allocation information for the one or more UEs to perform a multihop transmission, and wherein the sidelink resource allocation information comprises:
   one or more baseline sidelink resources for the one or more UEs of the multihop transmission, wherein the one or more baseline sidelink resources for the one or more UEs comprise indication of a base sidelink resource allocation; and
   relative sidelink resource allocation information for the one or more UEs of the multihop transmission relative to the one or more baseline sidelink resources, wherein the relative sidelink resource allocation information for the one or more UEs comprises a first index indicating a quantity of a first sidelink resource allocation above the base sidelink resource allocation for a first UE of the one or more UEs and a second index indicating a quantity of a second sidelink resource allocation above the base sidelink resource allocation for a second UE of the one or more UEs.

2. The method according to claim 1, wherein the sidelink resource allocation information comprises:
   one or more additional information for the one or more UEs of the multihop transmission.

3. The method according to claim 1, wherein:
   the first message indicates at least one of sidelink resource allocation information or one or more sidelink resources for the one or more UEs to perform at least one of an acknowledgement (ACK) or negative ACK (ACK/NACK) sidelink transmission or a sidelink retransmission.

4. The method according to claim 1, further comprises:
   sending a second message to the one or more UEs, the second message comprising at least one change in the following:
   one or more sidelink resources;
   the sidelink resource allocation information; or
   additional information provided in the first message.

5. The method according to claim 4, wherein the at least one change is one or more of:
   a UE Transmitter List change;
   a carrier indicator list change;
   a time domain resource allocation change;
   a frequency domain resource allocation change;
   a time gap between an initial transmission and a retransmission change;
   a Sidelink (SL) semi-persistent scheduling (SPS) configuration index change;
   at least one of an SPS activation or release indication change;
   a Modulation and Coding Scheme (MCS) list information change;
   a UE antenna type index list change;
   a UE antenna panel index list change;
   a UE antenna port index list change;
   Resource Pattern Time Index (RPTI) list change;
   Resource Pattern Frequency Index (RPFI) list change;
   Resource Pattern Time Length (RPTL) List change;
   a transmit power list change;
   a Frequency hopping-Multihop list change;
   a Periodicity-Multihop list change;
   a Demodulation Reference Signal (DMRS)-Multihop-SidelinkConfiguration list change;
   a TransformPrecoder-Multihop list change;
   a nrofHARQ-Processes-Multihop list change;
   a repK-RV-Multihop list change;

a repK-Multihop list change;
a Powercontrol mode-Multihop list change; or
a P0-MultiHop-PSSCH-AlphaSet list change.

6. The method according to claim 1, wherein:
the first message comprises one or more cyclic redundancy check (CRC) values encoded with Multihop Radio Network Temporary Identifiers (RNTI).

7. The method according to claim 1, further comprises:
sending, via a radio resource control (RRC) signalling, an RNTI to the one or more UEs.

8. The method according to claim 1, further comprises at least one of following:
creating a Resource Pattern Frequency Index (RPFI) list, the RPFI list comprising allocated sidelink resources blocks for each of a plurality of UEs involved in the multihop transmission; and including the RPFI list in the first message; or
creating a Resource Pattern Time Index (RPTI) list, the RPTI list comprising time slot information of allocated sidelink resources blocks for each of the plurality of UEs involved in the multihop transmission; and including the RPTI list in the first message.

9. The method according to claim 1, further comprises:
coordinating with another network device to determine at least one of resource allocation information or one or more sidelink resources, when a plurality of UEs involved in the multihop transmission are served by the network device and the another network device.

10. The method according to claim 1, further comprises:
including at least one antenna configuration for the one or more UEs in the first message, the at least one antenna configuration comprising at least one of the following:
an antenna type;
an antenna port; or
an antenna panel.

11. The method according to claim 1, wherein the first message is sent only to a cluster head of a group of UEs.

12. The method according to claim 1, wherein the first message comprises one or more of:
a group identifier (ID);
a UE transmitter list;
a carrier indicator list;
a time domain resource allocation;
a frequency domain resource allocation;
a time gap between an initial transmission and a retransmission;
a Sidelink (SL) semi-persistent scheduling (SPS) configuration index;
at least one of an SPS activation or release indication;
Modulation and Coding Scheme (MCS) list information;
a UE antenna type index list;
a UE antenna panel index list;
a UE antenna port index list;
Resource Pattern Time Index (RPTI) list;
Resource Pattern Frequency Index (RPFI) list;
Resource Pattern Time Length (RPTL) List;
a transmit power list;
a Frequency hopping-Multihop list;
a Periodicity-Multihop list;
a Demodulation Reference Signal (DMRS)-Multihop-SidelinkConfiguration list;
a TransformPrecoder-Multihop list;
a nrofHARQ-Processes-Multihop list;
a repK-RV-Multihop list;
a repK-Multihop list;
a Powercontrol mode-Multihop list; or
a P0-MultiHop-PSSCH-AlphaSet list.

13. The method according to claim 1, wherein the multihop transmission is based on one or more of:
a unicast type of multihop transmission;
a multicast type of multihop transmission; or
multiple multihop transmissions comprising subgroup multihop transmissions in a same group of UEs.

14. A method for a wireless communication device, comprises:
sending, to a network device or to another wireless communication device, a scheduling request for a multihop transmission; and
receiving a first message from the network device or the another wireless communication device in response to the scheduling request, wherein the first message indicates sidelink resource allocation information for one or more User Equipments (UEs) to perform the multihop transmission, and wherein the sidelink resource allocation information comprises:
one or more baseline sidelink resources for the one or more UEs of the multihop transmission, wherein the one or more baseline sidelink resources for the one or more UEs comprise indication of a base sidelink resource allocation; and
relative sidelink resource allocation information for the one or more UEs of the multihop transmission relative to the one or more baseline sidelink resources, wherein the relative sidelink resource allocation information for the one or more UEs comprises a first index indicating a quantity of a first sidelink resource allocation above the base sidelink resource allocation for a first UE of the one or more UEs and a second index indicating a quantity of a second sidelink resource allocation above the base sidelink resource allocation for a second UE of the one or more UEs.

15. The method according to claim 14, further comprises:
receiving a second message from the network device or the another wireless communication device, the second message comprising at least one change in at least one of the sidelink resource allocation information or one or more sidelink resources provided in the first message.

16. The method according to claim 14, further comprises:
determining sidelink resource allocation information for the one or more UEs involved in the multihop transmission based on the first message, wherein the first message includes a plurality of sidelink resources; and
providing the determined sidelink resource allocation information to the one or more UEs involved in the multihop transmission.

17. The method according to claim 14, wherein the sidelink resource allocation information comprises:
one or more additional information for the one or more UEs of the multihop transmission.

18. A wireless communication device, comprising:
at least one processor; and
one or more memories coupled to the at least one processor and storing programming instructions for the at least one processor to:
send, to a network device or to another wireless communication device, a scheduling request for a multihop transmission; and
receive a first message from the network device or the another wireless communication device in response to the scheduling request, wherein the first message indicates sidelink resource allocation information for one or more User Equipments (UEs) to perform the multihop transmission, and wherein the sidelink resource allocation information comprises:

one or more baseline sidelink resources for the one or more UEs of the multihop transmission, wherein the one or more baseline sidelink resources for the one or more UEs comprise indication of a base sidelink resource allocation; and relative sidelink resource allocation information for the one or more UEs of the multihop transmission relative to the one or more baseline sidelink resources, wherein the relative sidelink resource allocation information for the one or more UEs comprises a first index indicating a quantity of a first sidelink resource allocation above the base sidelink resource allocation for a first UE of the one or more UEs and a second index indicating a quantity of a second sidelink resource allocation above the base sidelink resource allocation for a second UE of the one or more UEs.

19. The wireless communication device according to claim 18, the one or more memories store the programming instructions for the at least one processor further to:

receive a second message from the network device or the another wireless communication device, the second message comprising at least one change in at least one of the sidelink resource allocation information or one or more sidelink resources provided in the first message.

20. The wireless communication device according to claim 18, the one or more memories store the programming instructions for the at least one processor further to:

determine sidelink resource allocation information for the one or more UEs involved in the multihop transmission based on the first message, wherein the first message includes a plurality of sidelink resources; and provide the determined sidelink resource allocation information to the one or more UEs involved in the multihop transmission.

\* \* \* \* \*